Figure 5:
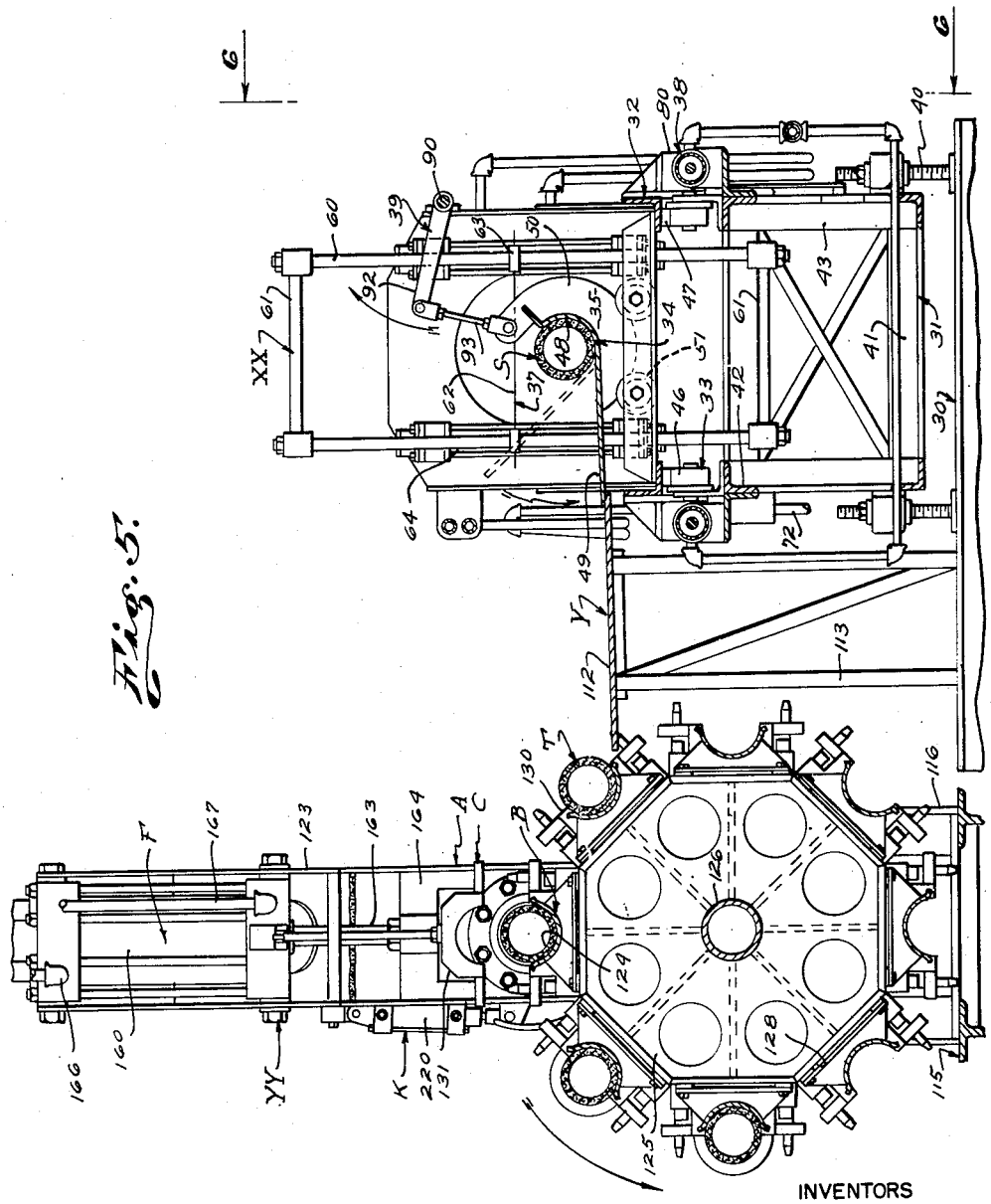

April 19, 1955  R. LACY ET AL  2,706,319
MECHANISM FOR TRIMMING AND BELLING CLAY PIPE
Filed April 10, 1951  10 Sheets-Sheet 1
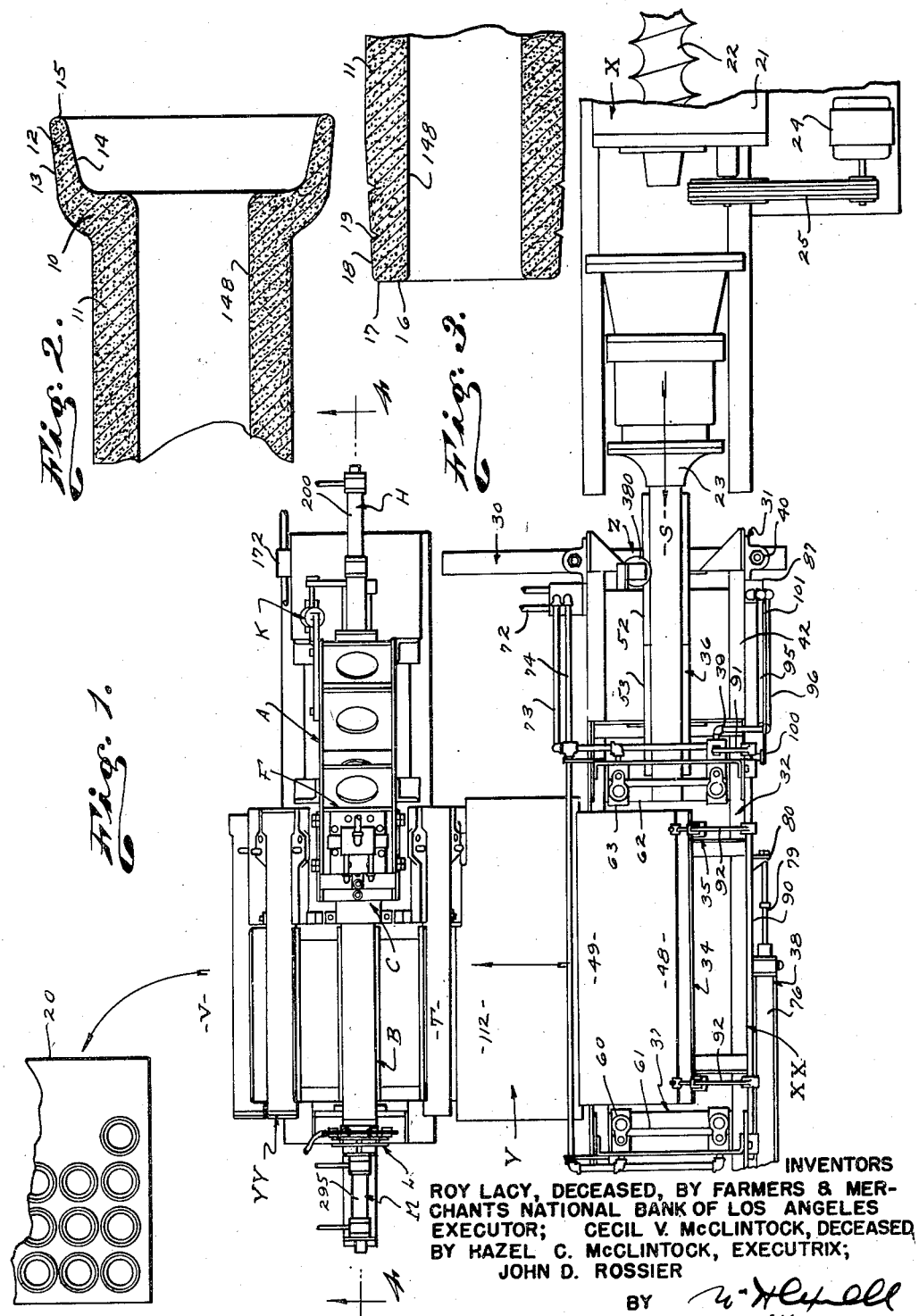
INVENTORS
ROY LACY, DECEASED, BY FARMERS & MERCHANTS NATIONAL BANK OF LOS ANGELES EXECUTOR; CECIL V. McCLINTOCK, DECEASED, BY HAZEL C. McCLINTOCK, EXECUTRIX; JOHN D. ROSSIER
BY
Attorney

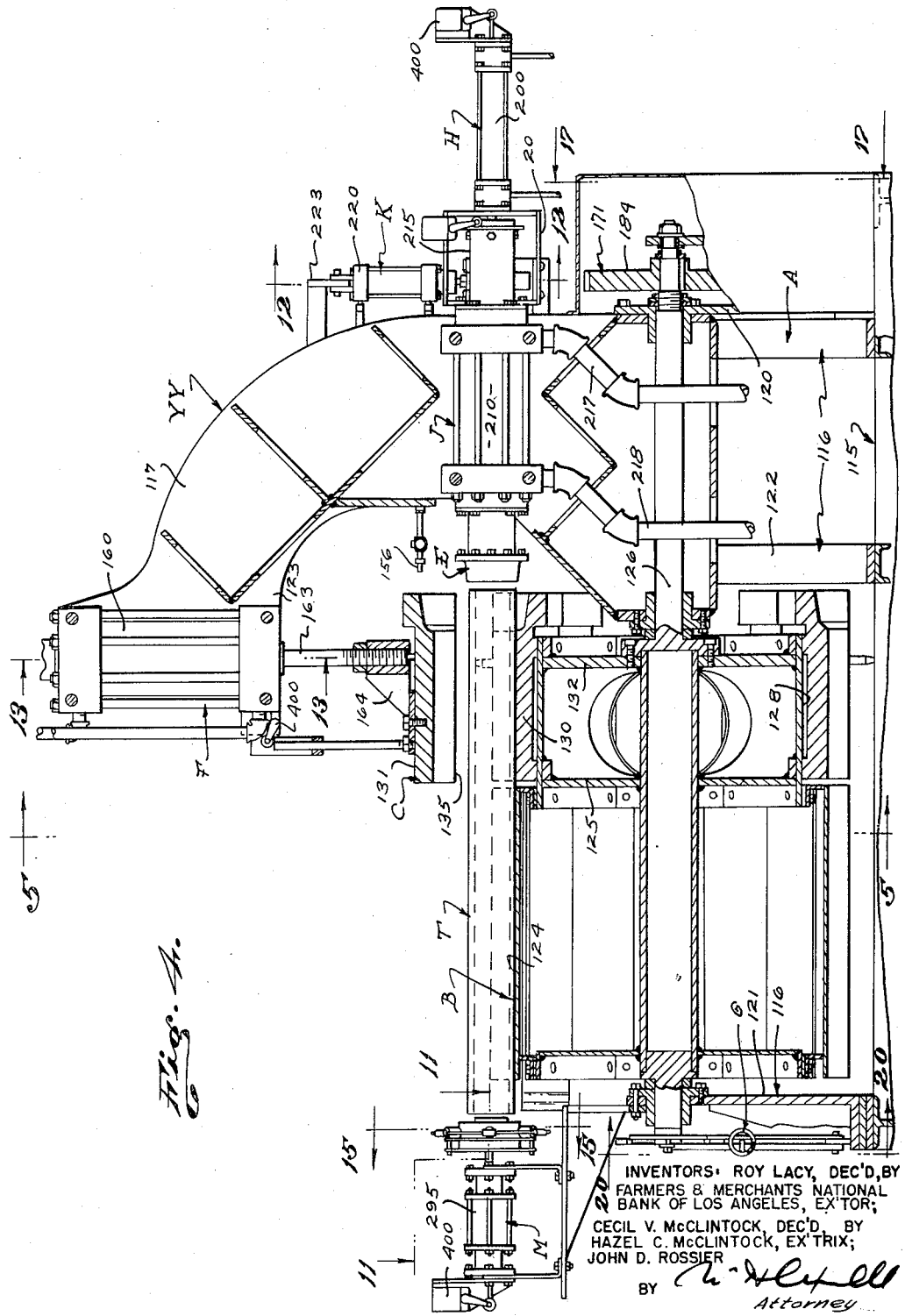

INVENTORS
ROY LACY, DECEASED, BY FARMERS & MERCHANTS NATIONAL BANK OF LOS ANGELES, EXECUTOR;
CECIL V. McCLINTOCK, DECEASED, BY HAZEL C. McCLINTOCK, EXECUTRIX;
JOHN D. ROSSIER
BY *[signature]*
Attorney

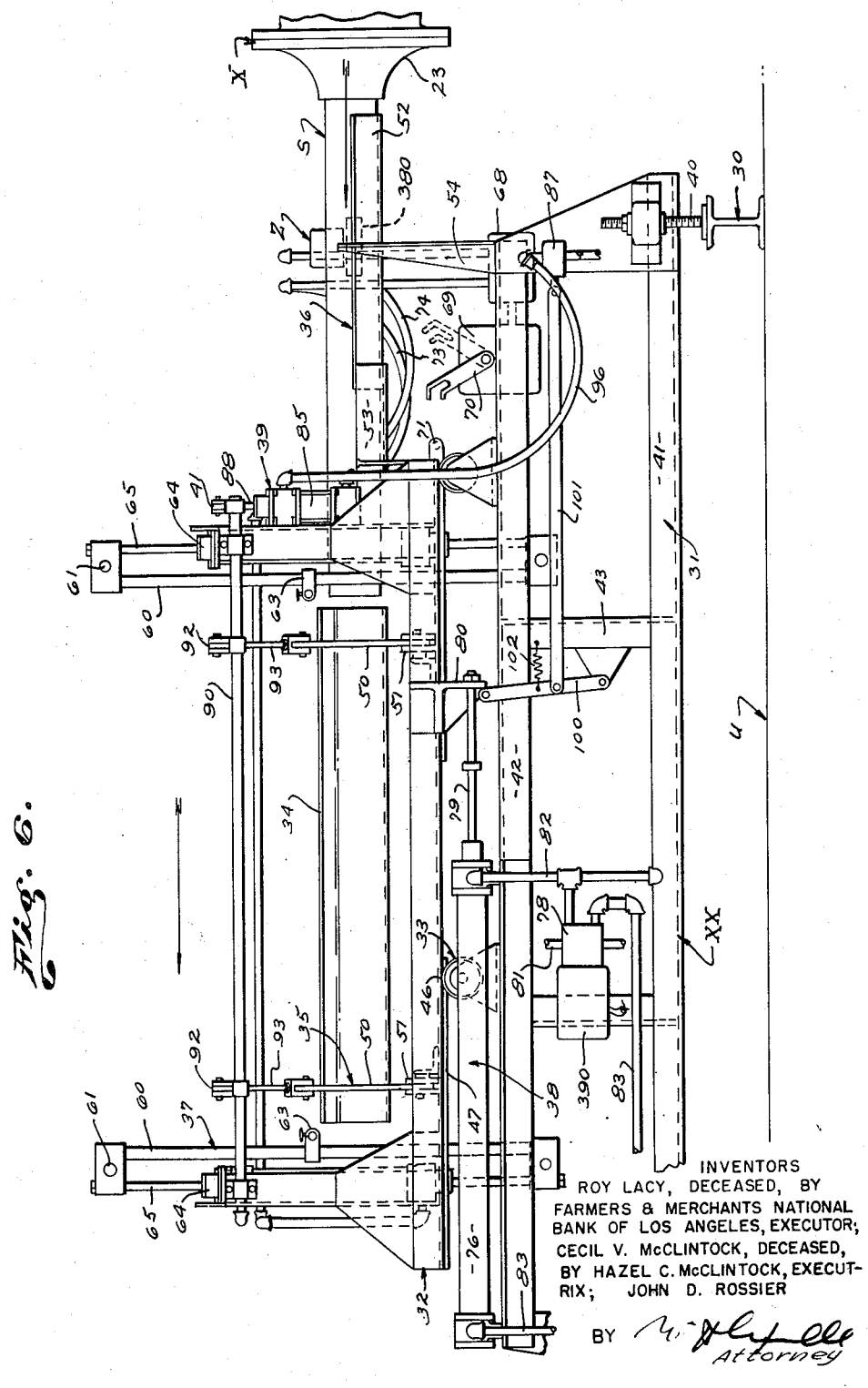

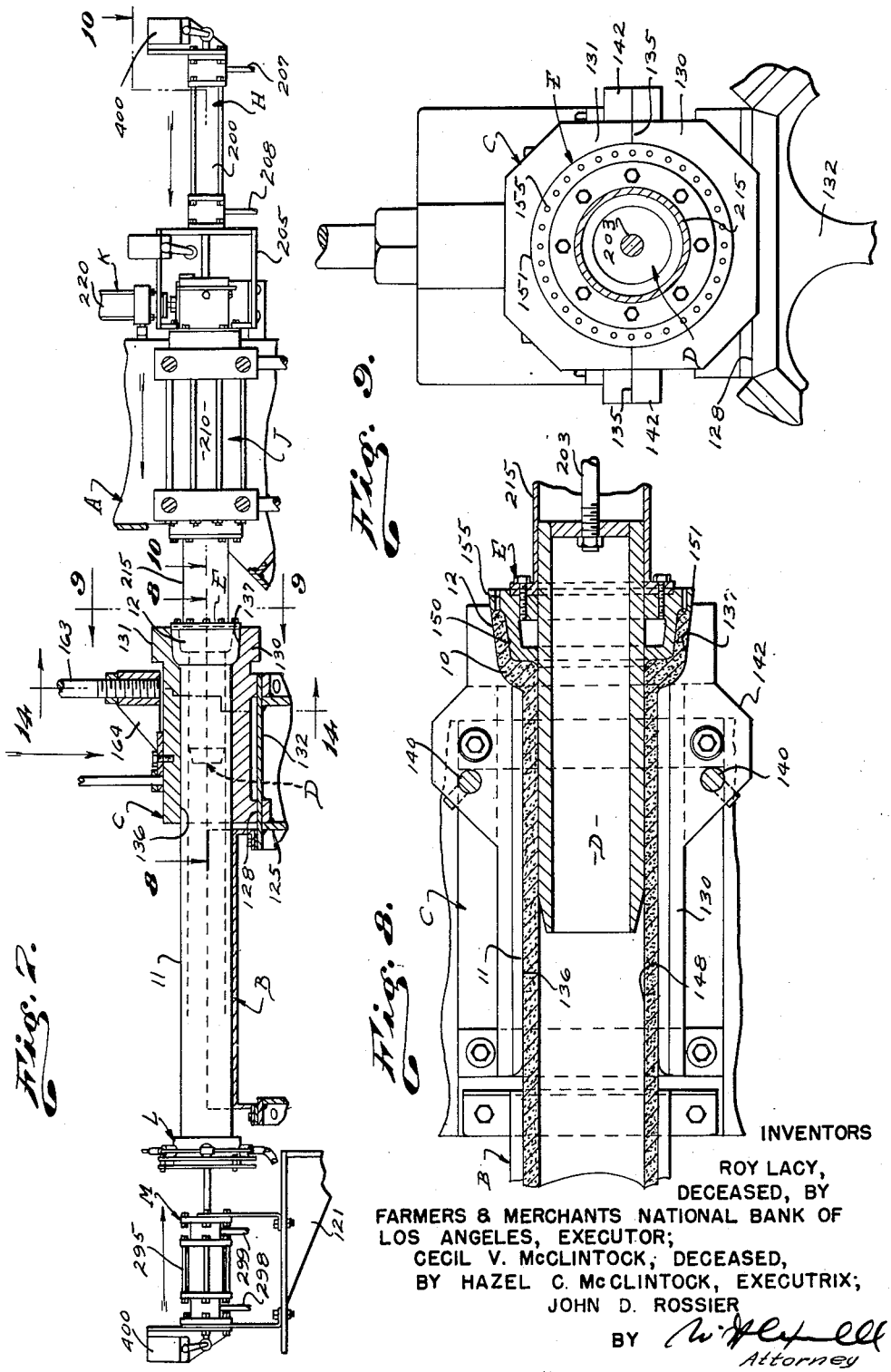

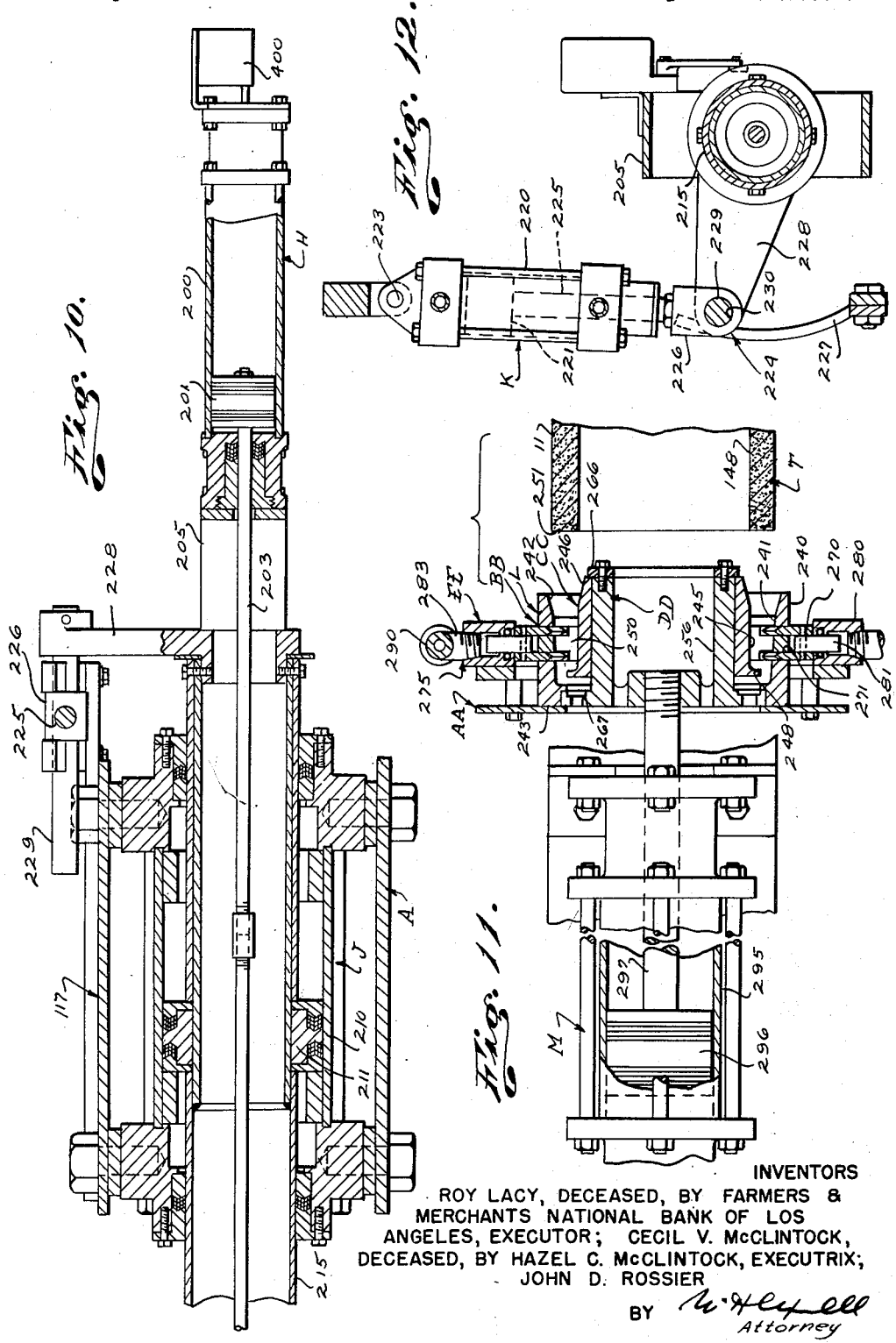

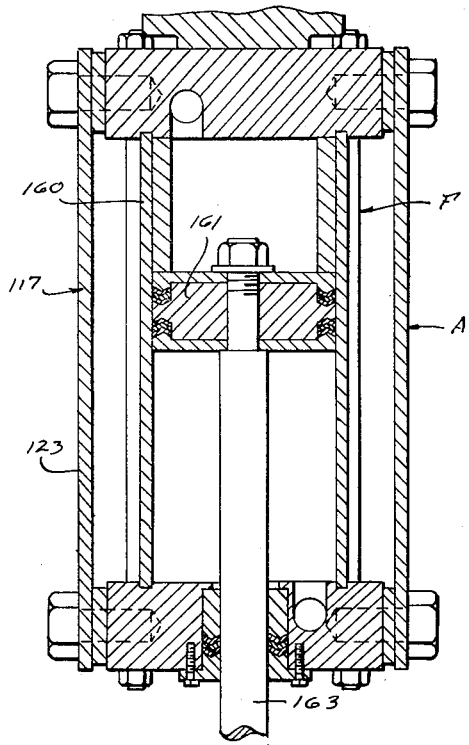
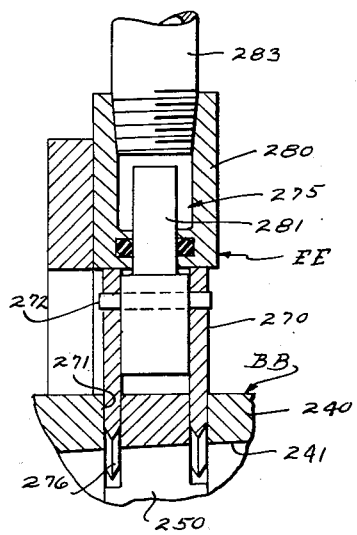
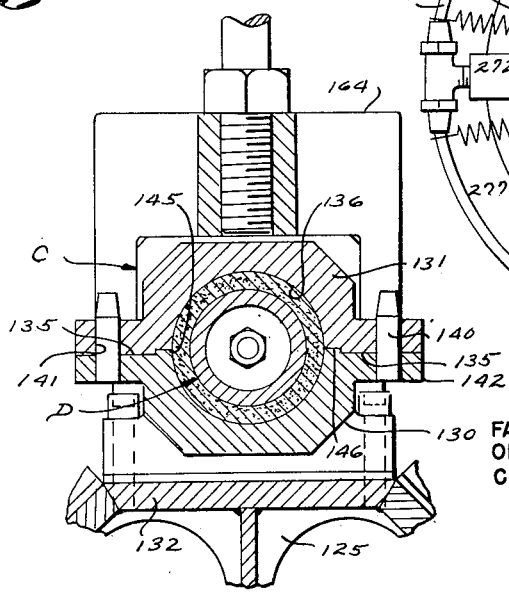
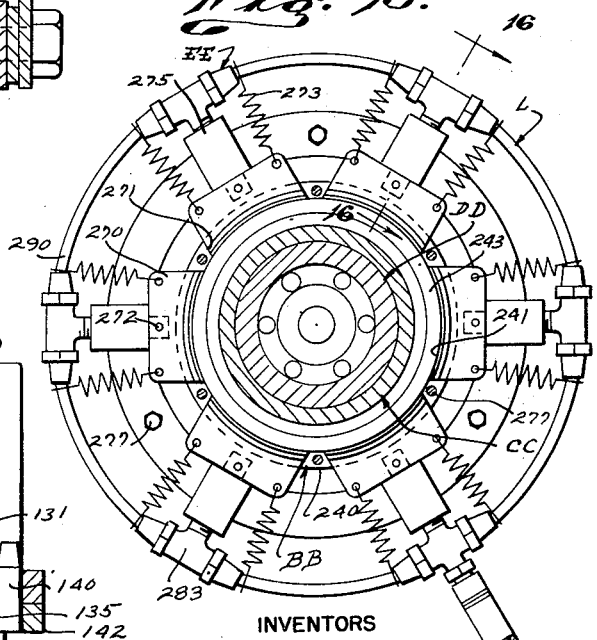
INVENTORS
ROY LACY, DECEASED, BY
FARMERS & MERCHANTS NATIONAL BANK
OF LOS ANGELES, EXECUTOR;
CECIL V. McCLINTOCK, DECEASED, BY
HAZEL C. McCLINTOCK, EXECUTRIX;
JOHN D. ROSSIER
BY
Attorney

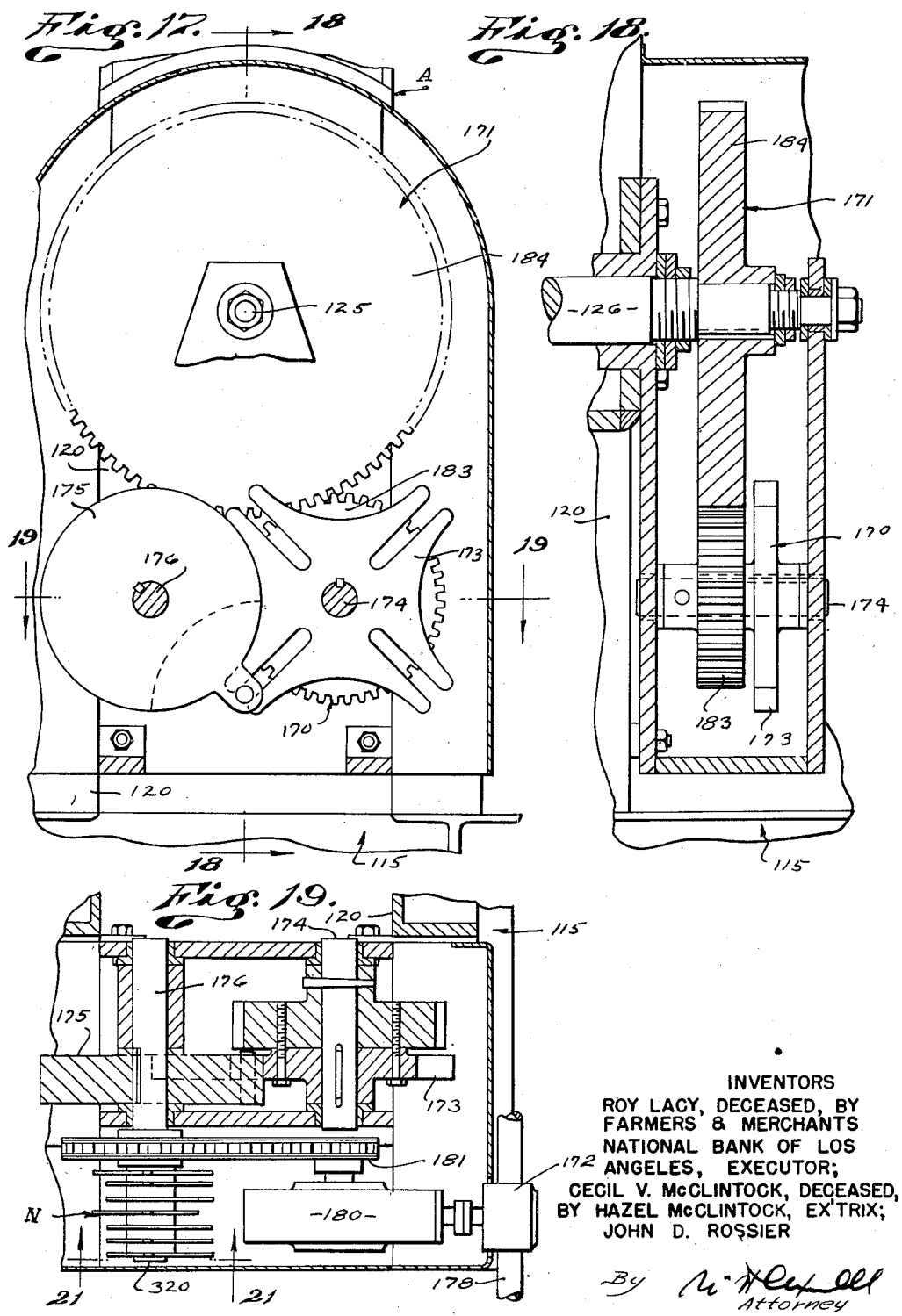

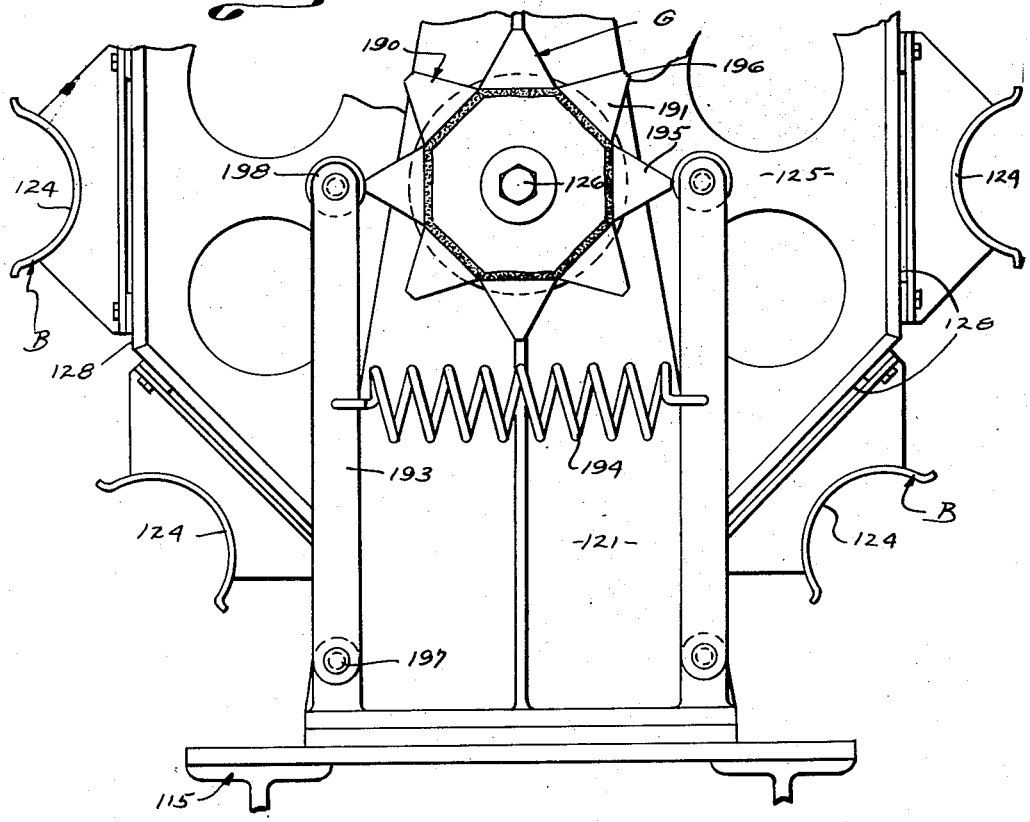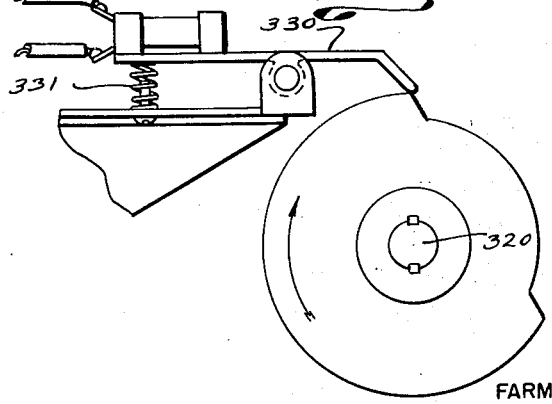

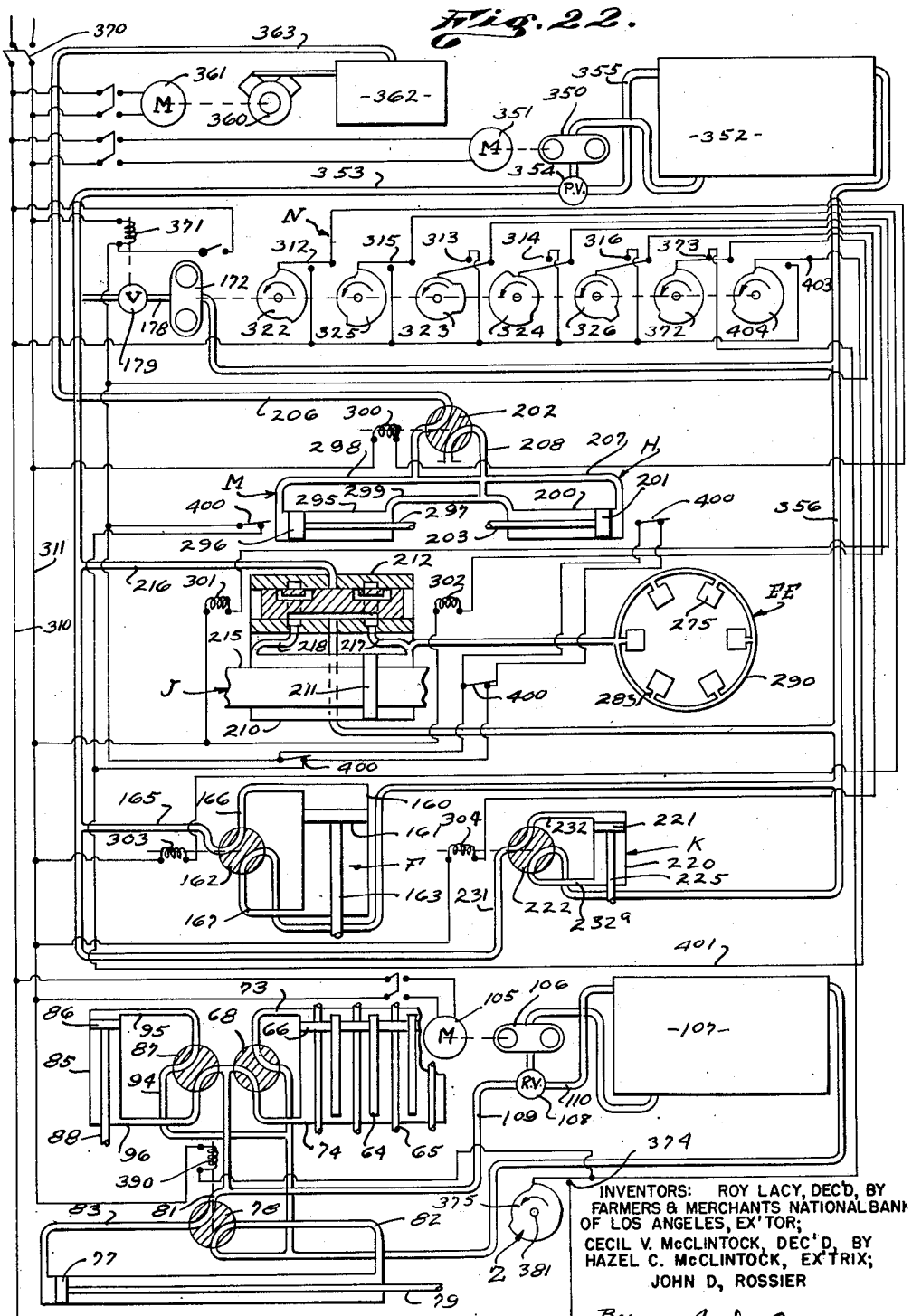

United States Patent Office 2,706,319
Patented Apr. 19, 1955

2,706,319

MECHANISM FOR TRIMMING AND BELLING CLAY PIPE

Roy Lacy, deceased, late of Los Angeles, Calif., by The Farmers and Merchants National Bank of Los Angeles, executor, Los Angeles, Calif.; Cecil V. McClintock, deceased, late of Los Nietos, Calif., by Hazel C. McClintock, executrix, Pasadena, Calif. and John D. Rossier, Compton, Calif., assignors, by mesne assignments, to Pearne & Lacy Machine Company, Los Angeles, Calif., a corporation of California Application April 10, 1951, Serial No. 220,251

17 Claims. (Cl. 25—30)

This invention is concerned with a mechanism for trimming and belling clay pipe, and it is a general object of the invention to provide a simple, practical, efficient mechanism for a machine suitable for the manufacture, forming or shaping of sewer pipe, or the like.

This application is filed as a division of application Serial No. 71,162, now Patent No. 2,591,267, entitled "Machine for Forming Clay Pipe With a Bell-Shaped End," filed January 15, 1949, wherein there is described and claimed a general machine in which the mechanism described and claimed in this application is but an element or part.

The mechanism which is the subject of the present invention can be used in the formation or manufacture of various products and certain features of the mechanism may be used to advantage in situations other than the one which we will describe. The machine in which the mechanism is incorporated is useful and practical for use in the manufacture, forming or shaping of malleable or plastic material, such as clay, into bell-ended sewer pipe, or the like, and therefore we will, in this application, make particular reference to a form and application of the invention practical for the manufacture or formation of sewer pipe. When we refer to sewer pipe we refer to a tubular body with one end enlarged or belled in the manner common to this type of product, and in the present application we will confine ourselves to consideration of sewer pipe that is straight and tubular and, further, will refer only to sewer pipe that is round in cross section. It is to be understood that the invention contemplates various modifications and variations, all of which will be apparent as a result of a consideration of the details herein set forth.

The machine in which the mechanism of the present invention can be incorporated to advantage involves, generally, an extruder, preferably an auger type extruder, that forms a continuous tubular column. A cutter cooperating with a carrier for the extruded column severs the column into blanks of given length and the carrier serves to discharge the blanks laterally onto a table across which the blanks roll to a position where they are received by inner die sections.

The mechanism as provided by the present invention is characterized by inner die sections, or a single inner die section, cooperatively related to an outer die section so that an opening is formed to hold a blank with an end of the blank projecting into a bell-shaped chamber. A core is introduced through the chamber and into the blank where it is held in the opening, whereupon a head slides along the core and into the chamber to enter the end portion of the blank and expand it into the chamber. Following formation of the bell on the end of the blank the head is rotated slightly, whereupon the head and core are withdrawn and the mold sections separated, freeing the finished or belled blank for removal from the machine. Aligned cylinder and piston mechanisms operate the core and head and a cylinder and piston mechanism operates or reciprocates the outer mold section. Preliminary to the mold sections' closing onto the bell a trimmer engages the blank at the end opposite from that which is belled, and serves to trim and score, and also to position the blank. In its preferred form the trimmer engages the end of the blank and advances the blank longitudinally to a predetermined position in the machine, and it has a plug that enters the trimmed end and a sleeve that surrounds the trimmed end. Scoring elements are carried by or operate through the sleeve and engage the exterior of the blank to score it. The scoring device is operated by fluid pressure operated means, and a suitable control coordinates the action of the various working parts.

It is a general object of the present invention to provide a belling mechanism of the general character referred to which involves but few simple, dependable parts, and which is of such form and construction as to operate dependably and effectively in the formation of heavy tubular products, such as sewer pipe, and the like.

Another object of the invention is to provide a belling mechanism of the general character referred to which is of simple, practical, dependable form and construction and which involves but few simple working parts.

It is a further object of the invention to provide a blank trimming means or mechanism of simple, practical, improved construction, and which serves to locate a blank and to perform desired operations thereon, preliminary to or coincidental with the belling of the blank.

A further object of the present invention is to provide a shaper which receives a simple, tubular blank of malleable or formable material such as clay, and through simple, dependable, effective means or mechanisms acts upon such blank to trim and score it at one end and to press and bell it at the other end.

A further object of the present invention is to provide a simple, dependable and practical machine involving a shaper receiving blanks and acting upon them to shape them in a predetermined manner, which shaper involves a plurality of units or mechanisms under control of a simple, dependable timer.

A further object of the present invention is to provide a shaper serving to receive simple, tubular blanks and act thereon to shape them in the desired manner, which shaper involves few simple, dependable units which are fluid pressure actuated and which are synchronized through the action of a simple, dependable control system.

The machine herein set forth and considered as a whole or as a unit is set forth and claimed in the parent application, Serial No. 71,162, filed January 15, 1949, entitled "Machine for Forming Clay Pipe With a Bell-Shaped End," while the structural features peculiar to the hub, its intermittent operation, and the frame construction related to the hub and its related elements, are the subject of application Serial No. 220,252 entitled "Multiple Mold Handling Mechanism for Clay Pipe Forming Machines," filed on even date herewith.

The various objects and features of our invention will be fully understood from the following detailed description of a typical preferred form and application of the invention, throughout which description reference is made to the accompanying drawings, in which:

Fig. 1 is a plan view of a machine embodying the present invention showing a supply of tubular material being delivered by the extruder, showing tubular blanks supplied to the shaper, and showing finally formed pipe being delivered by the shaper. Fig. 2 is an enlarged detailed sectional view at one end of the finally formed pipe, showing the form or shape of the bell provided thereon. Fig. 3 is a sectional view of the other end of the pipe, showing the manner in which it is trimmed or finished and provided with scoring. Fig. 4 is a vertical longitudinal sectional view through the shaper provided by the present invention, showing a blank in position in the shaper ready to be acted upon, and showing the various elements of the shaper in the unoperated or retracted position, being an enlarged view taken generally as indicated by line 4—4 on Fig. 1. Fig. 5 is a transverse sectional view of the machine as shown in Fig. 4, being a view taken as indicated by line 5—5 on Fig. 4. Fig. 6 is a side elevation of the machine shown in Fig. 5, being a view taken as indicated by line 6—6 on Fig. 5. Fig. 7 is a view of a portion of the mechanism shown in Fig. 4, being the mechanism that supports and acts upon the blank in the shaper and showing the units or elements of such mechanism actuated or fully operated. Fig. 8 is an enlarged plan section of a portion of the mechanism shown in Fig. 7, being a view taken as indicated by line 8—8 on Fig. 7. Fig. 9 is an enlarged detailed transverse sectional view taken as indicated by line 9—9 on Fig. 7. Fig. 10 is an enlarged plan section of a portion of the mechanism shown in Fig. 7, being a view taken substantially as indicated by line 10—10 on Fig. 7. Fig. 11 is an enlarged plan sectional view of a portion of the mechanism shown in Fig. 4, being a view taken substantially as indicated by line 11—11 on Fig. 4. Fig. 12 is an enlarged, sectional view taken as indicated by line 12—12 on Fig. 4. Fig. 13 is an enlarged, vertical, sectional view of a portion of the mechanism shown in Fig. 4, being a view taken as indicated by line 13—13 on Fig. 4. Fig. 14 is an enlarged, transverse, sectional view taken as indicated by line 14—14 on Fig. 7. Fig. 15 is an enlarged, detailed, transverse, sectional view taken as indicated by line 15—15 on Fig. 4. Fig. 16 is an enlarged, detailed, sectional view taken as indicated by line 16—16 on Fig. 15. Fig. 17 is an enlarged, detailed, sectional view taken as indicated by line 17—17 on Fig. 4. Fig. 18 is a sectional view of the mechanism shown in Fig. 17, being a view taken as indicated by line 18—18 on Fig. 17. Fig. 19 is a plan section of the mechanism shown in Fig. 17, being a view taken as indicated by line 19—19 on Fig. 17. Fig. 20 is an enlarged, detailed, end view of a part of the mechanism shown in Fig. 4, being a view taken as indicated by line 20—20 on Fig. 4. Fig. 21 is a detailed view of a portion of the mechanism shown in Fig. 19, being a view taken as indicated by line 21—21 on Fig. 19, and Fig. 22 is a schematic diagram of the principal working parts of the machine, showing the fluid pressure and electrical systems provided by the present invention.

The machine illustrated throughout the drawings is such as to initially form or produce a supply S of tubular form, and the particular supply shown is a body of clay, or the like, round in cross section, and of the character from which sewer pipe, or the like, is formed. The supply S is acted upon by the machine to first form it into elongate tubular blanks T, which are transferred or delivered to a shaper which acts upon the blanks one at a time to trim one end and bell the other end.

In Fig. 2 of the drawings a finished blank or length of pipe, such as is formed by the present machine, is illustrated, showing the belled end with a thickened portion 10 on the straight, tubular body 11 and with an outwardly flared portion or bell 12 joined to and continuing or projecting from the enlarged portion 10. In the particular case illustrated the exterior 13, as well as the interior 14, of the bell 12 is tapered and the extreme outer end 15 of the bell is rounded, all as clearly illustrated in Fig. 2 of the drawings. The machine of the present invention acts upon the other or opposite end of the tubular body 11 to trim it. This end portion of the body 11 is preferably trimmed so that its end 16 is smooth and flat and has its inner and outer corners 17 suitably dressed off or rounded. Furthermore, the extreme end portion 18 may be slightly tapered, and this portion is provided with a plurality of indentations 19 in the nature of scoring that acts to hold or anchor grout that may be used in securing this portion of the body 11 in the bell end of an adjoining pipe section.

The machine incorporating the present invention involves, generally, an extruder X, preferably an auger type extruder, that serves to deliver the desired supply S of material to be acted upon, a blank former XX which serves to sever the supply S of material delivered by the extruder to form it into blanks T of predetermined length, transfer means Y receiving blanks from the former X, a shaper YY receiving the blanks T from the means Y, one at a time, and acting upon them, one at a time, to finally deliver them at a point V, where they may be conveniently handled by a suitable carrier 20, or the like, and control means Z coordinating the action of the extruder X, former XX and shaper YY.

The extruder X may vary widely in form, type, or construction, although we prefer to employ an auger type extruder, and the extruder is preferably arranged to deliver the supply S horizontally to the former XX. In the drawings we have illustrated the principal portions of the extruder, namely, the body 21 thereof, in which the auger or screw 22 operates, the head or die 23 from which the supply S issues, and a prime mover or motor 24 that operates the auger 22 through a suitable drive 25. The present invention is in no way concerned with the details of the extruder, and it is to be understood that these elements of the machine may be varied widely, as circumstances may require.

The blank former XX serves generally to receive the continuous supply S of tubular material from the extruder and to cut such supply into blanks of predetermined length, and then deliver them laterally, and while they are maintained with their axes parallel with that of the supply S, to the transfer means Y. The blank former that we have illustrated as included in the machine of the present invention involves, generally, a base 30, a frame 31 supported on or from the base, an elongate carriage 32, a mounting 33 supporting the carriage from the base for reciprocation relative thereto, a carrier 34, a mounting 35 for the carrier supporting the carrier with its center of operation coaxial with that of the supply S, an extensible rest 36, cutting means 37 operating on the supply S to sever it into blanks T of predetermined length, operating means 38 for the carriage, operating means 39 for the carrier, and various other elements and features as will be described.

The base 30 of the former which may be of any suitable form or construction is preferably a rigid or stationary structure, for instance, a beam structure carried on a suitable floor or foundation U.

The frame 31 is an elongate structure supported from the base 30 to be parallel with the extruder X and to be immediately adjacent the delivery end of the extruder so that it extends forward therefrom. In the construction illustrated the frame is adjustably supported from the base through suitable supporting or adjusting screws 40 and it involves, generally, a lower or bed portion 41 and an upper or head portion 42. Vertical parts or uprights 43 extend between the bed and head and support the head a suitable distance above the bed.

The carriage 32 is an elongate frame-like construction or element supported on the frame 31 through the means 33 to extend parallel with the axis of the extruder and in the case illustrated it is a structure that is rectangular in plan configuration.

The means or mounting 33 supporting the carriage on the frame 31 involves cooperating rollers and rails. In the particular case illustrated suitable flanged rollers 46 are supported at the upper side of the frame head 42 at points spaced longitudinally of the frame and rails 47 depend from the bottom of the carriage 32 and are engaged with or supported by the rollers. Through this construction the carriage 32 is supported from the frame 31 to extend parallel with the longitudinal axis of the extruder and so that it may be operated or reciprocated the desired amount longitudinally of the extruder or parallel with said axis.

The carrier 34 is a tiltable element, that is, it is mounted on the carriage by the means 35 so that it can be rocked or tilted for the purpose hereinafter described. The carrier 34 is an elongate trough-like element with a concave seat portion 48 the curvature of which is substantially the same as that of the exterior of the supply S delivered by the extruder. In the particular case illustrated the carrier extends parallel with the longitudinal axis of the extruder and is mounted by the means 35 so that the concave seat is in position to receive and support the supply as it issues from the extruder. The carrier is made somewhat shorter than the length desired or required for the blanks T to be formed by the former and is such that it may be located between the cutters 37 of the former to be clear thereof when the former operates to sever the supply into a blank, such positioning of the carrier being shown in Fig. 6 of the drawings.

A feature of the carrier 34 is a lip 49 joined to or extending from one edge or side of the seat 48 and extending throughout the length of the carrier. The lip extends outwardly from the seat and upwardly, as indicated in dotted lines in Fig. 5, when the carrier is in receiving position receiving supply S from the extruder and the carrier is operable to a delivering position where the lip 49 extends laterally and somewhat downward to engage or overlap the means Y as shown in full lines in Fig. 5 of the drawings.

The mounting means 35 for the carrier 34 supports the carrier in the desired position aligned with the extruder and for rocking or tilting movement between the positions just described. In the form of construction illustrated the mounting 35 involves longitudinally spaced curved tracks 50 on the exterior or under side of the carrier and rollers 51 on the carriage 32 to support the tracks. The edges or faces of the tracks 50 are curved concentric with the axis of the seat 48 and the tracks are segmental in form or extend only partially around the carriage so that the carriage is open at one side or where the lip occurs in order to allow a blank formed in the carrier to be discharged therefrom to the means Y.

The extensible rest 36 bridges the opening that might otherwise occur between the carrier 34 and the die 23 of the extruder in order to effectively support the supply S of extruded material as it issues from the die and particularly when the carrier is moved away from the die or to a position such as is shown in Fig. 6 of the drawings.

The rest 36 involves, generally, two telescoping or overlapping sections 52 and 53, the section 52 being located in a fixed position or being mounted stationary by a bracket 54 projecting from the frame 31 while the section 53 is mounted on the end of the carriage 32 facing the die 23 to project from that end of the carriage, and in the case illustrated, to slide under the projecting end of section 52. It is preferred, in practice, that the sections 52 and 53 of the rest be concave or trough shaped so that they effectively guide the supply S of formed material from the die 23 to the carrier 34 of the former.

The cutting means or cutters 37 of the former are supported by the carriage and serve to sever the supply S of formed material into blanks of the desired length. In practice the extruder X is operated to deliver the supply S at a rate somewhat in excess of that which can be handled by or which is needed by the former to form the desired blanks T, with the result that the former T is provided with two cutters which act upon the supply S in the carrier to simultaneously trim the excess amount of supply from the outer end thereof and sever the blank from the supply. The cutters are located at or immediately beyond the ends of the carrier and are spaced apart so that the blank cut thereby is of the desired length. In practice the blank thus cut is slightly longer than that actually required for the formation of the finished pipe, the excess material of the blank being eliminated in the shaper as will be hereinafter described.

By mounting the cutters of means 37 on the carriage they move with the carrier as it moves lengthwise of the longitudinal axis of the extruder and serve to support the supply as it issues from the extruder. The cutters operate as the carrier moves away from the extruder so that their operation is completed before the carriage is operated or tilted in such manner as to deliver the formed blank to the means Y. In the particular form of the invention illustrated the cutter at the inner end of the carrier severs the blank from the supply S, while the cutter at the outer end of the carrier trims the projecting end of the blank or of the supply.

In the case illustrated the cutters are of the wire type and are both alike and each cutter is shown as involving spaced vertically disposed rods 60 and cross heads 61 connecting the upper and lower ends of the rods. The cutting wire 62 extends between suitable brackets 63 on the rods, the brackets being located at suitable points between the cross heads 61.

Suitable means are provided to guide and operate the structure just described so that the wire is reciprocated transversely of the supply on the carrier to cut it in the desired manner. In the case illustrated cylinders 64 are fixed to or on the carriage and pistons 66 operate in the cylinders and have rods 65 projecting from the ends of the cylinders, which rods are joined to the cross heads 61. The particular mechanism illustrated is such that when the wire carrying frame formed by the rods 60 and cross heads 61 is in an up position, as shown in Fig. 5, the wire 62 is well above the supply to be cut, and to make a cut this frame is moved down to a position where the wire is below the supply to be cut and is left in the down position until the next cut is to be made, whereupon the said next cut is made as the frame is moved up or back to the position shown in Fig. 5.

A suitable control is provided for the cylinder and piston mechanisms that operate the frame formed by the rods 60 and cross heads 61. In fact, a single control is provided to operate the cylinder and piston mechanisms of both cutters, since the cutters are operated simultaneously.

The particular control illustrated in the drawings involves a valve 68 mounted in a fixed position on the frame 31, an operator 69 for the valve having a projecting arm 70, and a lug 71 projecting from the carriage 32 to engage and cooperate with arm 70. The valve 68 has two positions and when in one position it admits fluid under pressure to the upper ends of the cylinders 64 and when in the other position it admits fluid under pressure to the other or lower ends of the cylinders 64. The valve operator 69 may be a typical ratchet type operator such that the valve 68 is operated only as the arm 70 moves from the dotted position shown in Fig. 6 to the full line position shown in Fig. 6, to which position the arm normally tends to move. When the carriage is retracted the lug 71 on the carriage engages and operates the arm 70 to the dotted position and under such condition the valve 68 remains unoperated. As the carriage moves out or to the extended position the lug 71 moves away from or relieves the arm 70 allowing it to assume the position shown in Fig. 6, whereupon the valve 68 operates.

When the valve 68 is operated the operating fluid supplied through a suitable duct 72 is admitted either to ducts 73 extending to the upper ends of cylinders 64 or ducts 74 extending to the lower ends of the cylinders 64, depending upon the position of the valve 68. In view of the fact that the valve 68 is mounted stationary on the frame 31 while the cylinders 64 are on the carriage 32, the ducts 73 and 74 are made flexible.

The operating means 38 for the carriage 32 is a fluid pressure actuated means and in the case illustrated it is shown as involving cylinders 76, and pistons 77 operating in the cylinders, and a control valve 78. Each cylinder 76 is mounted in a fixed position on the head 42 of the frame 31 and so that it extends parallel with the axis of the former and with that of the extruder X. Each piston 77 slides in its cylinder and has a rod 79 extending from one end of the cylinder 76 and coupled to the carriage by a suitable bracket 80. The cylinder and piston mechanism just referred to is of such size and design as to operate the carriage between an in or retracted position where the carrier receives the supply S close to the die 23 and an extended or out position where the carrier is in position to deliver the cut blank T to the means Y.

The valve 78 has two positions. In one position it admits fluid under pressure from supply pipe 81 to one end of cylinder 76 through a pipe 82 and when in the other position it admits fluid from the pipe 81 to the other end of the cylinder through the pipe 83.

The operating means 39 for the carrier is a fluid pressure actuated means and is shown as involving a cylinder 85, a piston 86 operable in the cylinder, a control valve 87 and a suitable operating connection between the piston rod 88 that projects from the piston 86 and the carrier. The cylinder 85 is pivotally mounted on the carriage 32. The connection provided between the piston rod 88 and the carrier is shown as involving a rocker shaft 90, an arm 91 projecting from the rocker shaft and pivotally connected to the piston rod, and arms 92 projecting from the rocker shaft and coupled to the carrier by suitable links 93. The rocker shaft 90 extends longitudinally of the carriage to be parallel with the carrier and the arms 92 are spaced a substantial distance apart longitudinally of the shaft 90, so that the links 93 effectively connect with the carrier at or near the ends thereof.

The valve 87 is shown mounted on the frame 31 and controls flow of fluid from a pressure supply line 94 to a line 95 extending to the top end of cylinder 85 or to a line 96 extending to the bottom end of cylinder 85. The lines 95 and 96 are flexible to accommodate the movement that occurs between the carriage and the frame.

The former further includes means operating the valve 87 after the cutters have been operated and when the carriage reaches its outermost or extended position, as shown in Fig. 6. When the carriage reaches this position the valve 87 is operated to deliver fluid under pressure to the lower end of cylinder 85 so that the carrier is rocked from the normal position where the lip 49 is up as indicated in dotted lines in Fig. 5, to the dumping or operated position where the lip 49 is down, as shown in full lines in Fig. 5.

The means illustrated for operating the valve 87 when the carriage reaches its outermost position is shown as including a pivoted lever 100 engaged and operated by a projecting part of the bracket 80 hereinabove described. A link 101 connects the pivoted arm 100 with the operating stem of the valve 87. A spring 102 located in the valve or as shown in Fig. 6 of the drawings normally yieldingly holds the arm 100 in position where the valve 87 admits fluid to the upper end of cylinder 85. As the carriage moves to its final out or extended position the bracket 80 strikes the arm 100 shifting the link 101 so the valve 87 is operated admitting fluid under pressure to the lower end of cylinder 85, with consequent operation or tilting of the carrier so that the blank thereon is delivered to the means Y. The tilt of the lip 49 is such that the blank rolls by gravity from the carrier to the means Y.

In the form of the invention illustrated the mechanism thus far described in detail, that is, the former XX, is provided with an independent power supply. In the case illustrated the power supply for the former involves a prime mover or motor 105 operating a suitable pump 106 which receives fluid from a reservoir 107 and delivers it through a pressure regulator 108 to a main supply line 109. A by-pass connection 110 returns excess fluid from the regulator 108 to the reservoir 107. The main supply line 109 supplies fluid under pressure to the lines of the several valves above described.

It is to be understood, of course, that suitable drain or return lines are provided to conduct fluid from the valves or the cylinders supplied thereby to the reservoir, as shown in the diagram (Fig. 22).

The transfer means Y receives the blanks formed by the former XX and delivers them one at a time to the shaper YY. In the preferred form of the invention the transfer means Y is of simple form or construction and involves, essentially, a table 112 extending from the former XX to the shaper YY. The table is shown as a simple flat plate-like part with its receiving end so located as to be immediately under or overlapped by the outer or delivery end of the lip 49 while its other end is located to deliver blanks T into the shaper YY at the desired point. In accordance with the present invention the table 112 is inclined or tilted somewhat or to follow the inclination of the lip 49, so that blanks T roll by gravity from the receiving end of the table to the delivery end. It will be understood that the pitch or inclination of the table may be made such as to cause the blanks to roll across the table at the desired rate and so that they are finally delivered to the shaper YY without injury.

The table 112 is preferably mounted in a fixed position, as by means of a suitable stand 113 carried by or projecting upward from the projecting portion of the base 30 of former XX.

The shaper YY in the form illustrated involves, generally, a frame A, a blank receiving cradle B, a die or mold C, a core D cooperating with the mold, a forming head E cooperatively related to the core and mold, means F operating the mold, means H operating the core, means J operating the forming head, means K rotating the forming head, a trimmer L, operating means M for the trimmer and a timer N for the aforementioned operating elements of the shaper.

The frame A of the shaper serves as a general support or carrier for the various other elements of the shaper and it involves, generally, a bed or base 115, a plurality of vertical standards 116, and a head 117. The bed or base 115 is shown as involving suitable frame members or beams resting on a suitable support or foundation, as for instance, the foundation W on which the former XX is supported. The bed or base 115 is an elongate structure and extends parallel with and is laterally offset from the former as will be seen in Fig. 1 of the drawings.

In the particular case illustrated the frame involves generally three vertical standards 116, a standard 120 at the inner or mold end of the machine, a standard 121 at the outer or trimmer end of the machine, and an intermediate standard 122 located between the standards 120 and 121.

The head 117 of the frame is at the mold end of the frame and is carried by or supported on the standards 120 and 122 to project upwardly therefrom at a point outward of the mold C and it has a laterally or horizontally projecting neck portion 123 at its upper end projecting over the mold C, as clearly shown in Fig. 4 of the drawings.

The blank receiving cradle B serves to receive a blank T from the means Y and supports such blank in line with the mold C, and it acts to continue as a support for the blank as the blank is operated upon by the trimmer L as well as the mold C and the parts that cooperate therewith, such, for example, as the core D and head E. It is to be observed that the cradle B receives the blank T with the blank horizontally disposed and extending parallel with the longitudinal axes of the extruder and former, and it maintains the blank in a horizontal and parallel position throughout operation of the shaper.

In the particular machine illustrated the means Y delivers the blank T at one side of the shaper and therefore the cradle B is movable or shiftable to shift or carry the blank T laterally to aligned position relative to the mold C, the trimmer L, the core D and the head E, which elements are in line but removed from the point where the blank is received by the shaper. In the preferred form of the invention the cradle B is pivotally mounted or supported to shift between the receiving position adjacent the means Y and the operating position in line with the mold C.

The cradle B is an elongate element with a concave seat 124 which is curved to conform to the exterior of the blank T as clearly shown in Fig. 5 of the drawings. The cradle is of such length as to extend a substantial distance along the blank T and thus affords support for the blank as it is moved from the position at the side of the shaper where it is received from means Y to the operating position in the shaper where it is in line with the mold C. In the particular case illustrated the cradle is mounted on an axis which causes it to swing somewhat up as it moves from the receiving position to the operating position, as will be apparent from Fig. 5 of the drawings.

A hub 125 is shown supporting the cradle B on or from a shaft 126, that extends lengthwise of the shaper and is supported by suitable bearings carried by the standards of the frame.

The hub 125 is preferably a drum-like structure of substantial diameter, making it effective as a carrier or mounting for a plurality of cradles. By providing a plurality of cradles circumferentially spaced around the drum 125 it is merely necessary to move the hub a portion of a revolution to move a cradle from the receiving position adjacent means Y to the operating position in line with the mold C. In such case the several cradles mounted on the hub are successively moved into operation and as the hub is rotated or intermittently advanced a cradle picking up a blank at the means Y first moves it laterally into alignment with the mold and then, after the shaper has acted upon the blank to form the pipe and on the next operation of the hub, that particular cradle is further carried laterally and away from means Y to the opposite side of the shaper or to the position Y where the formed pipe is discharged from the shaper.

In the particular machine illustrated there are eight cradles on the hub 125, in which case the hub is so constructed that its periphery is octagonal in cross sectional configuration, each face 128 of the hub serving as a mounting or support for a cradle.

The die or mold C is a sectional element or structure preferably involving two sections. The particular mold construction illustrated in the drawings is divided lengthwise or longitudinally into an inner or bottom section 130 and an outer or top section 131. The mold involves, in addition to the sections 130 and 131, guiding means acting to guide the sections into aligned or assembled position as the mold is operated by the means F, as will be hereinafter described.

The inner section 130 of the mold C is shown related to a cradle B to be fixed or stationary relative thereto and to be aligned therewith at one end thereof. In such case the inner section 130 shifts or moves in the machine in the same manner as does its complementary cradle B, that is, it is so mounted as to shift between a receiving position adjacent the means Y and an operating position in alignment with the core D and the head E.

In a machine such as we have illustrated, wherein there are several cradles B which successively operate and which are carried by a single hub 125, we provide a corresponding number of inner mold sections 130, that is, we provide a mold section 130 in alignment with each cradle B. Furthermore, we prefer to mount the inner mold sections 130 on a portion or extension 132 of the hub 125, to the end that the hub with its several cradles and several inner mold sections forms a rigid unit rotatably supported by the shaft 126.

In practice, and as will be apparent from the description to follow, the mold sections 130 are subject to high pressures during operation of the shaper and they do more than merely carry the blank, as is the case of the cradles, and therefore the hub extension 132 which carried the mold sections is made or constructed so that it is rigid and strong, or is such as to effectively withstand the working pressures which come upon it. In the case illustrated the hub extension 132 is shown of heavy webbed construction and the inner mold sections 130 are made fast to the periphery of the hub extension 132.

With the construction just described each inner mold section 130, being in line with and extending from one end of a cradle B, serves as a continuation or extension of such cradle and serves as an effective support for the blank T in the course of carrying the blank from the side of the shaper, where it is received from means Y, to the position where it is to be operated upon. In like manner each mold section acts with and supplements the action of its registering cradle B in carrying the formed blank or pipe away from the position in which it has been operated upon and to the discharge position V at the side of the shaper opposite to that at which the blank was received.

The outer or top section 131 of the mold C is shiftable relative to the inner section of the mold between a position engaged with the inner section where the two sections combine to establish the desired structure around the blank, as shown in Fig. 7, and a retracted or withdrawn position where it is completely disengaged from the blank, as shown in Fig. 4.

Where the machine involves a plurality of inner mold sections 130 as hereinabove described there may be a corresponding or complementary outer mold section for each inner mold section. However, it is preferred that there be but one outer mold section 131 and that the said outer mold section be so mounted as to successively cooperate with the inner mold sections as they are brought into operating position through intermittent rotation or operation of their supporting hub.

In the particular machine illustrated there is but one outer mold section 131 and it is mounted or located at the upper portion of the machine to be movable vertically into and out of cooperative engagement with a lower or inner mold section. It will be apparent of course that the outer mold section might be arranged in any desired position about the axis of the hub so long as it is so located as to be movable into cooperation with an inner mold section which is in position ready for operation.

The mold sections 130 and 131 are shown with flat abutting faces 135 and the sections have registering cavities that establish an opening 136 snugly receiving the blank T and an enlarged chamber 137 extending from the outer end of the opening and into which the end portion of the blank may be pressed or belled to shape it as shown in Fig. 2 of the drawings.

In the particular case illustrated or where the machine is forming pipe round in cross-section and the bell is round in cross section, the mold sections cooperate to establish a round opening 136 that snugly receives the round blank T and the chamber into which the material of the blank is formed to establish the desired bell is round and concentric with the opening 136. It will be apparent from the drawings how the mold sections may be formed or designed to have the desired engagement around the blank T and how they serve to establish a mold cavity 137 at the end portion of the blank suitable for the formation of any desired end part on the end of the blank such, for example, as a bell, as shown in Fig. 2 of the drawings.

The means provided for guiding the mold sections 130 and 131 into cooperative engagement may vary with the mold construction, or with the manner in which the mold sections are operated relative to each other. Where inner mold sections are successively brought into operating position to cooperate with a single vertically reciprocating top mold section we have found it advantageous to provide guide pins 140 projecting from the faces 135 of the inner mold sections to enter or be received in guide openings 141 entering the top or outer mold section from the face 135 thereof. In the particular form of construction illustrated the mold sections are provided with laterally projecting flanges 142 along which the faces 135 extend and the pins 140 and openings 141 occur at these flanges.

As a further means of guiding or centering the mold sections relative to each other we provide one mold section with recesses 145 and the other mold section with ribs 146 which project into or engage with the recesses.

The core D is an elongate part arranged concentric with the mold and is mounted to reciprocate relative to the mold. In accordance with the present invention the core is of substantial length and is such as to move from a retracted position clear or free of the outer or bell end of the mold (see Fig. 4) to an extended or operating position where it extends a substantial distance into the mold or inwardly in the mold from the chamber portion 137 thereof, as shown in Fig. 8. By thus extending the core a substantial distance into the mold concentric with the opening 136 of the mold, and by making the core of such diameter as to snugly fit the opening 148 in the blank T, a substantial portion or length of the blank adjacent the end portion of the blank that is pressed or worked into the cavity or chamber 137 is confined, and when the forming operation takes place, as will be hereinafter described, the original shape of the blank as it is received in the shaper is not disturbed or varied at any point except at the bell end of the mold where is is formed in the desired manner.

In the case where the opening 148 in the blank is a straight elongate round opening, the core D is of corresponding size and shape and the core is mounted coaxially with the mold to shift lengthwise thereof. In the particular case illustrated the head E of the mold is effectively supported, as will be hereinafter described and the core D is slidably supported in the head.

The forming head E cooperates with the mold C and the core D to form material at the end of the blank into the desired bell shape as shown in Fig. 2. In the preferred form of the invention the head is an annular element concentric with the core and is movable axially relative thereto and relative to the mold C between a retracted position where it is out of the mold and clear thereof, as shown in Fig. 4, and an in or engaged position where it is within the cavity 137 of the mold, as shown in Figs. 7 and 8.

The exterior or outer surface 150 of the head is shaped relative to the cavity 137 in the mold so that when the head is in the full engaged position as shown in Fig. 8, the head and cavity cooperate to form the material of the blank into the desired bell on the end of the blank. In the particular case illustrated the head has a radially projecting flange 151 which enters the mouth or outer end portion of the cavity 137 and which forms a final closure for the cavity when the head is in the fully engaged position.

In the preferred form of the invention the various parts of the machine are set or regulated so that the blank T positioned in the mold C to be operated upon by the core and head is slightly longer at the mold end than is necessary for the formation of the desired bell. This being the case there is an excess of material in the mold or between the mold and the head as the head advances into the in or operating position, which excess material must be relieved from the structure or allowed to escape. In the case illustrated an annular series of escape openings 155 are provided in the flange 151 of the head and as the structure operates the excess material escapes through these openings as proofings.

It is most important to observe that with the structure that we have provided, that is, with the mold, the core and the head related and operating as hereinabove described, we form the bell on the end of the blank, not by expanding the material of the blank as occurs with the usual methods of manufacturing products of this kind, but rather we form the bell by pressing the material at the end portion of the blank into the mold or between the mold and the head and around the core, all with the result that the bell portion of the pipe is at least as dense, if not more dense, than the balance of the blank or pipe. This is a highly important feature of the present invention since it effectively overcomes a weakness or undesirable feature characteristic of ordinary sewer pipe.

It is to be understood that the elements just described, which contact or cooperate with the material of the blank T, are finished so that their surfaces are smooth and are not such as to stick to the material formed or to tear the material formed, and furthermore, it is to be understood that if desired the mold may be heated in order to aid freeing of the mold sections from the formed material.

A suitable gas jet 156 is shown located to deliver a flame in such manner as to play upon the mold or more specifically the top section of the mold, in a manner to keep the mold suitably heated.

The means F provided for operating the mold serves, generally, to move the mold sections into and out of cooperative relation. The means F provides primarily a structure for operating the top section of the mold relative to the bottom section, and this structure is preferably a fluid pressure actuated mechanism.

Means F is shown as involving a cylinder 160, a piston 161 operating in the cylinder, and a control valve 162. The cylinder 160 is supported vertically by the neck 123 of frame A so as to be located above and suitably spaced from the mold C. The piston 161 has a rod 163 depending from the cylinder 160, which rod has the upper or top mold section 131 fixed thereto, as by means of a suitable bracket 164.

The valve 162 has two positions. When in one position it admits fluid under pressure from a supply line 165 to a line 166 delivering it to the upper end of cylinder 160, in which case the piston 161 is moved downwardly in the cylinder. In the other position of the valve 162 the fluid under pressure is admitted from the supply line 165 to a line 167 which conducts it to the lower end of cylinder 160 causing the piston 161 to move upwardly in the cylinder. When the piston 161 is moved downwardly, as above described, the mold section is moved into seated engagement with the lower mold section which is in operating position, so that the blank T located in operating position is encased by the mold ready for operation of the core in the head.

Where the lower or bottom section of the mold is shiftable, as hereinabove described, operating means is provided for shifting the lower mold section or lower mold sections, as the case may be, to successively bring them into operating position. In the particular machine illustrated, and as above described, the cradles and lower mold sections are joined or coupled in a unit characterized by the hub which carries the cradles and the lower mold sections, and which is rotatable on the shaft 126. In this case a single operating means is provided to rotate or operate the hub 125 and, consequently, a single means operates both the cradles and the lower mold sections.

In the form of the invention illustrated the means provided to operate the lower mold sections and their related cradles is a fluid pressure actuated means and it is such as to intermittently operate or rotate the hub 125. The operating means is such as to intermittently move the hub so as to successively bring the lower mold sections into operating positions or into register with the top mold section, it being necessary that a bottom mold section to cooperate with the top mold section be in proper position and be stationary as the upper mold section is moved downwardly into operating position.

The particular means illustrated for operating the hub 125 involves, generally, an intermittent movement mechanism 170, a drive 171 from the movement mechanism 170 to the hub, and a fluid motor 172 driving the mechanism 170.

The intermittent movement mechanism is shown as a typical or conventional Geneva movement involving, generally, a star wheel 173 on a driven shaft 174, and a pin wheel 175 on a drive shaft 176. It will be apparent from Fig. 17 of the drawings how constant rotation of the pin wheel 175 will cause intermittent movement of the star wheel and how the star wheel is effectively held between movements.

The motor 172 is shown as a fluid operated motor driven by fluid supplied through a supply line 178 under control of a valve 179. In the particular case illustrated the drive from the motor 172 to the drive shaft 176 of the Geneva movement involves a speed reduction in a gear box 180 and a suitable chain drive 181 from the mechanism in box 180 of the shaft 176.

The drive from the Geneva movement 170 to the hub 125 is shown as a gear drive involving a pinion 183 on the shaft 174 meshing with and driving a gear 184 on the shaft 126. In the particular machine illustrated there are eight lower mold sections on the hub and therefore it is desired that the hub be moved one eighth of a turn each time it is operated, whereas the Geneva movement 170 illustrated is such as to have four positions. The drive 171 is therefore proportioned so that although the driven shaft 174 of the Geneva movement moves one quarter of a revolution on each operation the shaft 126 moves only one eighth of a revolution.

The valve 179 controlling the supply line 178 to motor 172 is, in accordance with the preferred arrangement, a normally open valve, and is such as to be, in effect, a master valve for the shaper in that it controls operation of the timer N.

In practice a machine constructed as above described and involving a multiplicity of inner mold sections combined with a corresponding number of cradles all on a common hub and requiring intermittent movement, as above described, results in great force being required to start each movement of the hub and also great force to stop each movement of the hub. A movement mechanism such as we have hereinabove described is effective and accurate for gaining the desired intermittent movement and may, in some cases, be all that is necessary for full and satisfactory operation. We prefer, however, to modify or supplement the movement mechanism above described by a modifying means G which serves or acts to add to the force exerted by the movement mechanism as the operation starts and also acts to apply a braking or dampening force to the movement mechanism as it reaches the end of each operation.

The particular modifying means illustrated in the drawings involves, generally, a cam wheel 190 on the hub shaft 126 and having a plurality of circumferentially spaced cam parts or lobes 191. The mechanism includes pressure arms 193 cooperating with the cam parts 191 and a spring 194 supplying the force exerted by the means G.

The cam wheel in the particular case illustrated is formed with eight lobes 191 which are toothlike and have flat outwardly converging sides 195 which terminate in lands or flat tips 196.

The arms 193 are pivotally supported on pivot pins 197 and carry followers or rollers 198 which engage and cooperate with the lobes of the cam. Where there are eight lobes on the cam the arms are arranged so that the followers are at diametrically opposite sides of the cam, as shown in Fig. 20. The followers are such as to normally bear on or rest on the lands 196 of the cam lobes as shown in Fig. 20, in which case the Geneva movement is operating without movements of the star wheel. When the followers 198 are thus engaged with the lands of the cam lobes the arms 193 are spread as shown in Fig. 20. The spring 194 is a helical tension spring coupled between the arms 193 normally yieldingly urging the arms together so that the followers 198 bear toward the cam.

With the parts arranged and proportioned as shown in Fig. 20 as soon as the movement mechanism or Geneva movement starts rotation of the hub the cam 190 rotates from the position shown in Fig. 20, moving the lands 196 out from under the followers whereupon the followers bear inwardly on inclined sides of the cams and apply the force or pressure of the spring to the cam in a manner to aid the Geneva movement in rotating the hub. This aid or supplemental action gained through means G is most effective as the hub movement is initiated.

As the Geneva movement approaches the end of a movement of the star wheel other cam lobes are moved toward a position where their lands support the followers 198 and as the cam is thus moved to a position similar to that shown in Fig. 20 the inclined faces of diametrically opposite lobes force the arms 193 apart against the resistance of spring 194 with the result that the spring exerts force resisting movement of the cam and consequently of the shaft 126 carrying the hub 125.

The means H provided for operating the core D between the retracted position clear of the mold and the engaged position within the mold, as shown in Fig. 8, is a fluid pressure actuated means involving, generally, a cylinder 200, a piston 201 operating in the cylinder, and a control valve 202. The piston rod 203 extending from the piston 201 extends forward from the cylinder 200 and connects with the outer end of the core D. The cylinder 200 is mounted in fixed position on a bracket 205 on the end of frame A. It will be observed from the drawings and particularly from Figs. 7 and 10 thereof, that the cylinder 200 is located outward of the means J which operates the head E and that the piston rod 203 is of substantial length and extends freely through the means J in reaching the core D.

The valve 202 controlling the action of the piston 201 in cylinder 200 has two positions. In one position the valve 200 passes fluid from a supply line 206 to a line 207 connected with the outer end of cylinder 200. When the valve is in the other position fluid from line 206 is passed through line 208 to the other or inner end of the cylinder. When fluid under pressure is admitted to the outer end of cylinder 200 piston 201 is moved inwardly causing the core to be moved inwardly and finally to the in or operating position shown in Fig. 7. When the forming operation has been completed the core is withdrawn from the formed pipe and from the mold by the operation of valve 202 and the consequent admission of pressure behind piston 201 to move it outwardly in cylinder 200.

The means J provided for operating the forming head E is a fluid pressure actuated means and is shown as involving, generally a cylinder 210, a piston 211 operable in the cylinder, and a valve 212 controlling the flow of fluid under pressure to the cylinder. The cylinder 210 is fixed to the frame A in alignment with the mold and cylinder 200. The piston 211 reciprocates in the cylinder 210 and a tubular piston rod 215 extends from the piston 211 and through both ends of cylinder 210 and around the piston rod 203. The head E is carried by or fixed to the inwardly projecting end of the piston rod 215 so that as the piston 211 is reciprocated in cylinder 210 the head is moved between a retracted position clear of the mold and an in or operating position within the mold, as above described.

The control valve 212 of means J as shown in the diagram, Fig. 22, has three positions, a neutral position as shown in the diagram, where fluid from a supply line 216 is shut off, an operating position where fluid from supply line 216 is admitted to a line 217, and an operating position where pressure from line 216 is admitted to a line 218. The line 217 extends to the outer end of cylinder 210 so that when fluid is supplied through line 217 the head is moved inward or to the in position shown in Fig. 8. The line 218 extends to the other end of the cylinder 210 and when pressure is supplied to line 218 the head is withdrawn or retracted.

The means K serves to rotate the head E following its movement to a fully engaged or operating position such as is shown in Fig. 8. The means K, as shown in the drawings, is a fluid pressure actuated means involving, generally, a cylinder 220, a piston 221 operable in the cylinder, and a control valve 222. In the form of the invention illustrated the cylinder 220 is supported from the frame A through a pivotal support 223 and an operating connection 224 is provided between the piston rod 225 that projects from the cylinder 220 and the piston rod 215 which carries the head E. The connection or mechanism 224 is such as to maintain the piston rod 215 operatively coupled with the piston rod 225 while the head is operated or shifted axially. In the case illustrated the cylinder 220 and the piston 225 projecting therefrom are in a plane normal to the axis of the piston rod 215 that carries the head E.

The mechanism 222 involves, generally, a head 226 on the outer end of piston rod 225, a guide 227 for the head 226, and an arm 228 projecting from the piston rod 215 and coupled to the head 226 by a finger 229. The arm 228 is fixed to the outer projecting end of piston rod 215 as shown in Fig. 10 and the finger 229 is carried by the outer end of arm 228 to project therefrom parallel with and laterally offset from the piston rod 215. The finger 229 is slidably engaged in an opening 230 in the head 226. As the piston rod 215 reciprocates the finger 229 moves in or through the opening 230, the head 226 being held against movement axially of the structure by the guide 227. The guide 227 involves spaced parts between which the head 226 is engaged, the engagement of the head with the guide parts being such as to allow the head to move up and down as the arm 228 is swung between positions such as are shown in full and dotted lines in Fig. 12 of the drawings.

With the construction just described introduction of fluid under pressure into cylinder 220 when the head is fully engaged in the mold will cause the head to rotate in the bell formed on the end of the blank T, in effect troweling the interior of the bell and freeing the head from the bell and proofings so that when means J is operated to retract the head the head is free of the formed material in the mold and moves out of the bell and mold clean or clear of the formed pipe.

The control valve 222 has two positions. In one position the valve 222 admits fluid under pressure from a supply line 231 to a line 232 connected to one end of cylinder 220. In the other position the valve admits fluid from the line 230 to a line 232ª connected with the other end of cylinder 200. Through the valve 220 the means K can be operated to rotate the head E in either direction.

The trimmer L embodied in the shaper YY is located at the end of the shaper remote from that where the mold and its cooperating parts are located. The trimmer in its preferred form serves several different functions and it preferably combines these functions. The trimmer serves primarily as a means to axially locate and shift, if necessary, the blank T preliminary to the mold being closed and the core and head being operated. In accordance with the general arrangement of principal elements hereinabove described the blank as formed or established by the former XX is discharged therefrom immediately onto the means Y and the means Y closely couples the former XX and the shaper YY all with the result that the blank T formed by the former rolls from the former to the shaper with little or no deflection or distortion and, consequently, is deposited in a cradle or shaper in a definite predetermined manner. In practice there may possibly be slight deflection of the blank as it passes from the former to the shaper causing it to be axially displaced slightly one way or the other, as it reaches the shaper and therefore we contemplate locating or relating the principal elements of the machine so that the blank enters or is received in the shaper in a position slightly toward the trimmer end of the shaper from that in which it occurs when the mold closes, and we provide the trimmer as a means engaging the blank and operating to position or shift it slightly forward or toward the mold to finally locate the end of the blank remote from the bell at a predetermined distance from the mold which forms the bell.

The trimmer further functions to trim or dress the end of the blank remote from the bell preferably both by smoothing or flattening that end of the flank and by rounding the corners thereof. Further, the trimmer preferably serves to establish scoring or indentations in the exterior of the trimmed end portion, and it may, if desired, establish a slight taper on the scored end.

The trimmer, as shown in the drawings, involves, generally, a base plate AA, a shell BB, a plug CC, means DD slidably relating the shell and the plug, and scoring means EE.

The base plate AA is shown as a simple flat plate disposed in a plane normal to the longitudinal axis of the shaper and it is related to the other parts of the machine to be reciprocated or moved axially through the means M as will be hereinafter described.

The shell BB involves an annular body 240 fixed to and projecting from the plate AA. The body 240 has a slightly tapered bore 241 and at its outer end it is outwardly flared as at 242. The shell has an inwardly projecting flange portion 243 at its inner end by which the body is joined to the plate AA and which cooperates with the plug CC, as will be hereinafter described.

The plug CC is located concentrically in the shell, being slidably supported in the shell by the means DD. The plug has an outer cylindrical surface 245 of such diameter as to slidably enter or engage in the opening 148 of the blank T and the tip end portion 246 of the plug is preferably tapered to facilitate entrance of the plug into the blank. An outwardly projecting flange 248 is provided at the inner end of the plug. The flange 248 is such as to cooperate with flange 243 in forming or defining an inner end wall at the inner end of cavity 250 provided between the exterior of the plug and the interior of the shell. It is this inner wall established by the shell and plug that engages the end 251 of the blank T to smooth and form it as desired.

The means DD is in the nature of a central guide slidably supporting the plug CC relative to the shell BB. The guide means DD has a centrally located guide part 256 projecting from the plate AA through the shell and to a point beyond the outer end of the shell. The plug CC is slidably mounted on the guide part 256 and is limited in its reciprocation or axial movement on the guide by an outer stop flange 266 and an inner stop flange 267.

When the structure just described is operated or shifted axially so that the shell engages over the exterior of the end of blank T while the plug CC enters into the opening 148 of blank T, the opening 241 in the shell slightly tapers the exterior of the end portion of the blank while the end 251 of the blank is being smoothed and rounded, as above described.

With the construction that we have provided the parts are effectively removed or disengaged from the trimmed or dressed end of the blank when the plate A is moved away from the end of the blank to first withdraw the shell from the end of the blank and thereafter withdraw the plug from the blank due to engagement of stop flange 266 with the plug, as shown in Fig. 11 of the drawings.

The scoring means EE in the form of the invention illustrated in the drawings, involves a plurality of like scoring devices or elements in a series circumferentially of the shell BB. Each scoring element involves one or more body parts 270 slidably carried in radial guideways 271 in the shell, a cross arm 272 connecting the parts 270, springs 273 normally yieldingly holding the parts 270 retracted, as shown in Fig. 16, and operating means 275 for the structure made up of the parts 270 and 272.

The inner ends 276 of the parts 270 are such as to be operated into the interior of the shell BB and are shaped and fashioned to establish or leave the desired imprint upon the exterior of the blank T in the course of its being trimmed as hereinabove described.

In practice the guideways 271 may be established in the shell BB in any desired manner. In the particular case illustrated the body 240 of the shell is made up of a plurality of sections joined together as by tie bolts 277. In the case shown there are three sections and the intermediate section is recessed to establish the desired guideways so that they extend radially of the shell. It is further preferred that the guideways be established in an annular or circumferential series so that the scoring members 270 when operated or moved to extend into the cavity established by the shell serve to, in effect, establish scoring entirely around the end portion of the blank T.

The operating means 275 provided for each of the units just referred to may involve a cylinder 280 and a ram 281 extending into the cylinder from the cross arm 272. A pressure supply line 283 connects into the cylinder 280 so that when fluid under pressure is admitted to the cylinder the ram 280 is displaced therefrom moving the scoring parts 270 inwardly from the position shown in Fig. 16 to a position where their tip ends 276 extend into and score the material located in the shell. The springs 273 return the scoring parts to their normal positions.

In the particular form of the invention illustrated the supply lines 283 of the several units just described are connected together or with a common header 290 and pressure is supplied to the header 290 from the line 217 to which pressure is admitted through the valve 212. The scoring mechanism is thus cooperatively coupled or related to the means J or at least the valve 212 of means J so that when the means J is operated to engage the head and the mold the scoring means operates to score the opposite end of the blank.

The means M provided for operating the trimmer is shown as a fluid pressure actuated unit involving, generally, a cylinder 295 and a piston 296. The cylinder 295 is mounted in fixed position on standard 121 of frame A to be in alignment with the trimmer and the mold of the shaper. The piston 296 reciprocates in the cylinder and a piston rod 297 projects from the piston and cylinder to connect with the plate AA.

The construction just described is such that when fluid under pressure is admitted to the outer end of cylinder 295 through a pressure connection 298 the piston 296 is moved inwardly moving the plate AA toward the blank T until the shell has engaged over the end of the blank and the plug CC has engaged inside the blank suitably positioning the blank axially, flattening the end 251 of the blank, trimming the corners thereof and also tapering the exterior of the blank. With the blank T thus positioned through the operation of the trimmer the blank is located in the machine ready for the mold to be closed or operated following which the core can be operated and the head operated in order to form the bell on the opposite end of the blank. When fluid under pressure is admitted to the other or inner end of cylinder 295, as through a pressure line 299, the plate AA is withdrawn or retracted, first disengaging the shell from the trimmed blank and then withdrawing the plug from within the trimmed blank.

In the preferred form of the invention the means M, as above described, is operated simultaneously with the means H and consequently the valve 202 which controls means H may also be utilized to control the operation of means M. In this case the line 208 of means H above described may be connected with line 299 of means M, while the line 207 of means H may be connected to line 298 of means M.

The timer N of the shaper coordinate the operation of the various operating means of the shaper hereinabove described. In the particular form of the invention illustrated the timer is an electrical control involving electromagnetic operating units for the valves of the operating means, switches controlling the electromagnetic operators and cam means controlling said switches.

The electromagnetic unit 300 is provided for operating valve 202. An electromagnetic unit 301 is provided for operating the valve 212 to one operating position while an electromagnetic unit 302 is provided for operating the valve 212 to the other operating position. An electromagnetic unit 303 is provided for operating valve 162. An electromagnetic unit 304 is provided for operating valve 222.

The electrical system in which the several electromagnetic operating units just referred to are connected is energized from power lines 310 and 311 and each electromagnetic unit is under control of a switch, there being a switch 312 for unit 300, a switch 313 for unit 301, a switch 314 for unit 302, a switch 315 for unit 303 and a switch 316 for unit 304.

The timer N preferably includes cam means controlling the action of the several switches above mentioned and in the case illustrated the cam mechanism or cam means is operatively coupled with the drive provided for operating the hub which carries the cradles and inner mold sections. In the particular arrangement illustrated there is a timer shaft 320 projecting from the shaft 176 that drives the pin wheel. The shaft 320 is thus constantly driven by the motor 172 through the mechanism in case 180 and the drive 181.

The cam means involves a plurality of cams axially spaced on the shaft 320 there being a cam 322 operating switch 312, a cam 323 operating switch 313, a cam 324 operating switch 314, a cam 325 operating switch 315, and a cam 326 operating switch 316. The several cams just referred to may be substantially alike, that is, they may be keyed on the cam shaft 320 and each may operate a rocker arm 330 carrying a mercury type switch, or the like. Such a typical switch is illustrated in Fig. 21 of the drawings. It is to be observed that in such a switch construction the cam operates to rock the mercury switch to one position while a spring 331 is provided for moving the switch to the opposite position.

It should be understood that in each valve there may be incorporated a spring which normally holds the valve in one position and when the electromagnetic operating unit of that valve is energized the valve is moved to the other position, with the exception of valve 212 in which case the valve is moved to one operating position by unit 301 and is moved to the other operating position by unit 302.

The several cams are designed or shaped and related so that the control switches of the several electromagnetic units above described are operated as follows. When the movement mechanism G that operates the hub carrying the cradle has operated a blank carrying cradle and lower mold section to a position in line with the mold and when that blank has come to rest in position to be operated upon, the means M of the trimmer L is operated to advance the shell and plug of the trimmer into engagement with one end of the blank while the means H is operated to advance the core into the other end of the blank and at the same time the means F is operated to move the upper mold section into operating position.

The structure is such that the means H and M operate faster than means F with the result that the core enters the blank before the mold is fully closed and, consequently, the trimmer has an opportunity to shift the blank axially, bringing it into the desired axial position before the mold finally closes, setting the blank tight in the mold with the core within the blank ready for the head to be operated.

When the mold is finally closed the means J operates, advancing the head into the mold and over the core until it finally reaches the in or fully operated position, at which time the bell of the pipe is completely formed. As this operation occurs the same pressure that operates means J operates the means EE of the trimmer so that while the formed blank is held at both ends the scoring means operates to establish the desired scoring at the exterior of the end of the blank remote from the bell. Following this operation the means K operates to rotate the head while it is maintained in the in or engaged position.

When the pipe is completely formed the means J, the means H and the means M are operated to withdraw the head, the core and the trimmer from the formed pipe, while the mold is being maintained closed. When the core and head have been freed of the pipe the means F is operated to open the mold. When the mold has been opened the shaper has completed its cycle of operation and the formed pipe is ready to be advanced to the position V where it can be removed from the machine as the shaper is next operated to move the next blank into position to be operated upon.

In the foregoing description the various operating means of the shaper have been referred to as fluid pressure actuated. It is to be understood that in practice any desired form of power may be employed to drive the various elements of the shaper. When fluid pressure is employed it is advantageous to employ liquid, as for instance oil, for operating all of the operating means except the means H and the means M, which are preferably operated by air.

In the diagram (Fig. 22) we show a liquid pressure generating means in the form of a pump 350 driven by a prime mover such as a motor 351 and operating to draw liquid from a reservoir 352 and deliver it to the pressure supply line 353 which connects to the several pressure supply lines requiring liquid under pressure. A pressure regulator valve 354 is provided by bypass excess pressure developed by the pump back to the reservoir through a connection 355. It is further to be understood that after the fluid has been employed to effect the desired operation or operations it may be returned to the reservoir 352 through a return system 356. We also illustrate a suitable means for supplying air under pressure to operate the means H and M. In the case illustrated an air pump 360 is shown driven by a prime mover such as a motor 361 and the air delivered by the pump is delivered into a reservoir 362 from which it is drawn by a pressure supply line 363 connected to the supply lines requiring air under pressure.

The control means Z is a general control for the structure hereinabove described and in the form illustrated includes, generally, a master switch 370 controlling the power lines entering the machine, an electromagnetic unit 371 related to the normally open valve 179 to close that valve when it is energized, a cam 372 in the timer N or operating in synchronism with the timer N and controlling a stop switch 373 for the unit 371 so that the circuit to the unit 371 is closed when the cycle of the shaper has been completed, as hereinabove described, or in other words when the mold of the shaper has finally opened freeing the mechanism ready for another operation. The control means Z further includes a normally closed starting switch 374 in series with the switch 373 controlling the unit 371, which switch 374 is under control of a cam 375.

The operation of the cam 375 controlling the switch 374 is synchronized with the operation of the extruder X so that when the extruder X has delivered a given supply S from the die 23 the switch 374 is opened, opening or breaking the circuit to the unit 371 through the closed switch 373 above described.

The means Z involves a drive for the cam 375 synchronized with the operation of the extruder X. In the particular case illustrated the drive for cam 375 involves a drive wheel 380 which engages the exterior of the supply S of extruded material issuing from die 23. The wheel 380 is on a shaft 381 which drives the cam 375.

The parts hereinabove described are related and proportioned so that under normal operating conditions the shaper operates faster than the extruder. The extruder is operating constantly or substantially constantly causing the supply S to constantly issue from the die 23 with the result that the starter cam 375 is rotated constantly.

From the foregoing description it will be apparent that the shaper is such as to be advantageously operated intermittently, that is, through a complete cycle, as above described, following which it can be completely shut off. As the shaper operates the cam 372 in the timer of the shaper operates, and through the relationship of parts that we provide the cam 372 operates somewhat faster than cam 375.

Assuming the starter to have been stopped by closing of the stop switch 373 due to the cam 372 operating the switch 373 to the closed position, the valve 179 is closed by the energizing of unit 371 with consequent stoppage of operation of the shaper leaving the switch 373 closed. When a given or necessary supply has issued from the extruder, rotating cam 375 to a position to open starter switch 374, the circuit through the unit 371 is opened, allowing valve 179 to open so that the shaper starts operation. As soon as the shaper starts operation the cam 372 starts to operate and cam 375 continues to operate, the cam 372 operating somewhat faster than cam 375. When the shaper has completed its cycle of operation, cam 372 closes switch 373 with consequent closing of valve 179 and stoppage of the shaper, and the shaper will remain stopped until the cam 375, which is trailing the cam 372 in operation, reaches a point where switch 374 is opened, at which time the circuit to unit 371 is again opened and the shaper again started on a new cycle of operation.

In the form of the present invention illustrated the valve 78 controlling the actuator or operating means for the carriage of the former is normally positioned so that fluid is admitted to cylinder 76 in a manner to position the carriage in an out or fully operated position where the carrier is located to discharge a blank onto the means Y. An electromagnetic unit 390 is provided to operate the valve 78 to a position where fluid is admitted to the opposite end of cylinder 76 in order to move the carriage to a position adjacent the die 23 of the extruder. The unit 390 is under control of the switch 374 so that when a sufficient supply has been delivered by the extruder to the carrier on the carriage the switch 374 opens, starting operation of the shaper, as above decsribed, and opening the circuit to the unit 390 so that the carriage proceeds to operate to the extended or normal position, carrying with it the extruded supply that is on the carrier, which is cut and discharged from the former when the carriage reaches the fully extended or normal position, as hereinabove described.

The invention further includes a safety means operating to prevent operation of the machine in the event that any one of the operating units thereof should become fouled or for any reason should fail to return to its normal unactuated position.

The safety means includes, generally, a plurality of safety switches 400, one for each operating unit to be controlled or to be included within the safety control. The several safety switches 400 are connected in parallel in a circuit carried by lines 401 and controlling unit 371. The safety switches 400 are normally closed switches arranged to be opened when their respective or controlled units reach their normal unactuated positions.

When the shaper is ready for the operating means H and M to be operated all of the operating means should be unactuated or ready to be operated, in which case all of the safety switches are open and the valve 179 is free of the safety control. Should any one of the several operating means fail to return to its unactuated position, then its safety switch will be closed and the safety circuit will be closed and the unit 371 energized and the valve 179 will be closed.

In order that the several operating means may proceed to operate from the position where they are unactuated and, consequently, result in closing of the safety switches incidental to normal operation, a switch 403 is provided in series in line 401 and is operated by a cam 404 driven with or by the timer. When operation of the several operating means is initiated through control Z the cam 404 has just opened switch 403 and it holds switch 403 open until the several operating means included in the safety circuit have had time to complete their operations and to return to the unactuated positions.

If any of the operating means have for any reason whatsoever failed to return to the unactuated positions by the time the switch 403 closes, under control of cam 404, then the circuit to unit 371 is completed and the shaper is cut out of operation. When the switch 403 is first opened the Geneva movement holds the hub 125 stationary with a blank T in position to be operated upon and it continues to so hold the hub until all operating means have returned to the unactuated positions.

From the foregoing description it will be apparent that through the present invention we have provided a machine which so handles a continuous, or substantially continuous, tubular supply being issued from a die as to establish blanks of predetermined length by making a cut at each end of each blank, which blanks are transferred to the shaper where they are operated upon one at a time, or successively, to finish them and to form or bell one end of each blank to establish a belled end in a most effective and practical manner. It is important to observe that through the present invention we synchronize the action of the extruder, former and shaper in a simple, practical and dependable manner and so that although the extruder delivers the supply at a rate slower than that that may be handled by the shaper, it supplies an excess of material to the former, with the result that the former operates to cut both ends of the blank simultaneously, and thus assure a blank of given length. It is also important to observe that the shaper so handles a blank as to initially position it axially an to thereafter swage or press a bell onto the end of the blank in the course of which operation excess material of the blank is eliminated and a fully formed pipe section is assured.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A blank shaping machine of the character described including, a tubular mold having a cylindrical opening adapted to snugly receive the blank and a chamber around the end of the blank, a core having a straight round end operable into the blank at the mold, a head operable relative to the core and mold to compress the blank in the mold, cylinder and piston means concentric with the mold for operating the head including a stationary cylinder, a piston in the cylinder and a rod on the piston projecting from the cylinder and carrying the head, and cylinder and piston means concentric with the mold for operating the core including a stationary cylinder, a piston in the cylinder, a piston rod on the piston extending from the last mentioned cylinder and carrying the core, and power means rotating adapted to rotate the head on the core and in the blank.

2. A blank shaping machine of the character described including, a tubular mold having a cylindrical opening shaped to snugly receive the end portion of the blank and having a chamber around the end of the blank, a core with a straight round end portion operable into the blank at the mold, a head operable along and around the core and in the mold to compress the blank in the mold, cylinder and piston means concentric with the mold for operating the head including a stationary cylinder, a piston in the cylinder and a rod on the piston projecting from the cylinder and carrying the head, and cylinder and piston means concentric with the mold for operating the core including a stationary cylinder, a piston in the cylinder, a piston rod on the piston extending from the last mentioned cylinder and carrying the core, and rotating means for the head including an arm projecting from the first mentioned rod and a cylinder and piston means oscillating the arm.

3. A blank shaping machine of the character described including, a tubular mold having a cylindrical opening shaped to snugly receive the end portion of the blank and having a chamber around the end of the blank, a core having a straight round end portion operable into the blank at the mold, a head operable along and around the core and relative to the mold to compress the blank in the mold, cylinder and piston means concentric with the mold for operating the head including a stationary cylinder, a piston in the cylinder and a tubular rod on the piston projecting from both ends of the cylinder and carrying the head at one end, and cylinder and piston means concentric with the mold for operating the core including a stationary cylinder, a piston in the cylinder, a piston rod on the piston extending from the last mentioned cylinder and through the tubular rod and carrying the core, and rotating means for the head including an arm projecting from the other end of the tubular rod and a cylinder and piston means oscillating the arm.

4. A blank shaping machine of the character described including, a tubular mold having a cylindrical opening shaped to snugly receive the end portion of the blank and having a chamber around the end of the blank, a core with a straight round portion operable into the blank at the mold, a head operable along and around the core and in the mold to compress the blank in the mold, cylinder and piston means concentric with the mold for operating the head including a stationary cylinder, a piston in the cylinder and a rod on the piston projecting from the cylinder and carrying the head, and cylinder and piston means concentric with the mold for operating the core including a stationary cylinder, a piston in the cylinder, a piston rod on the piston extending from the last mentioned cylinder and carrying the core, and rotating means for the head including an arm projecting from the first mentioned rod to shift therewith, a cylinder and piston unit, and a sliding pivotal connection between the unit and arm.

5. A machine for acting on a tubular blank of malleable material including, a mold engageable around one end of the blank, a trimmer engageable with the other end of the blank shifting the blank axially into a predetermined position in the mold, elements cooperating with the mold to press the first mentioned end of the positioned blank into a predetermined shape, separate operating means for the mold, the trimmer, and said elements, and a control for the operating means synchronizing the operating means so operation of the mold follows that of the trimmer while operation of said elements follows that of the mold.

6. A machine for shaping a tubular blank; one end portion of the blank, a trimmer engageable with the other end of the blank shifting the blank axially into a predetermined position relative to the mold when the mold is open, elements cooperating with the mold when closed to press the first mentioned end of the positioned blank into a predetermined shape, and operating means adapted to actuate the trimmer, then the mold and then the said elements, the trimmer including a plate shiftable relative to the blank, a shell carried by the plate engageable over the blank, a guide projecting from the plate, and a plug slidable on the guide and engageable in the blank.

7. A machine for shaping a tubular blank of malleable material including, a sectional mold shaped to close snugly around one end portion of the blank, a trimmer engageable with the other end of the blank and shiftably carried and engageable with the end of the blank to move the blank axially into a predetermined position relative to the mold when the mold is open, elements cooperating with the mold when closed to press the first mentioned end of the positioned blank into a predetermined shape, the trimmer including a plate shiftable relative to the blank, fluid pressure actuated means operatively engaged with the plate to shift it axially, a shell carried by the plate engageable over the blank, a guide projecting from the plate, and a plug slidable on the guide and engageable in the blank, fluid pressure operated means actuating the mold, fluid pressure actuated means operatively engaged with the said elements, and a control synchronizing the operation of said fluid pressure operated means whereby the trimmer is operated, then the mold is closed and then said elements are operated.

8. A machine adapted to act on a tubular blank of malleable material including, a sectional mold adapted to be closed around one end of the blank, a trimmer engageable with the other end of the blank shifting the blank axially into a predetermined position relative to the mold when the mold is open, elements cooperating with the mold when closed to press the first mentioned end of the positioned blank into a predetermined shape including a core engageable in the blank and a head pressing the blank in the mold, the head having openings to allow excess material of the blank to escape from within the mold, and whereby the trimmer is operated, then the mold is closed and then said elements are operated.

9. A machine adapted to act on a tubular blank of malleable material including, a sectional mold adapted to be closed around one end of the blank, a trimmer engageable with the other end of the blank shifting the blank axially into a predetermined position relative to the mold when the mold is open, elements cooperating with the mold when closed to press the first mentioned end of the positioned blank into a predetermined shape, the trimmer having a part shiftable into engagement with the blank to establish an indentation therein whereby the trimmer is operated, then the mold is closed and then said elements are operated.

10. A machine adapted to act on a tubular blank of malleable material including, a sectional mold adapted to be closed around one end of the blank, a trimmer engageable with the other end of the blank shifting the blank axially into a predetermined position relative to the mold when the mold is open, elements cooperating with the mold when closed to press the first mentioned end of the positioned blank into a predetermined shape, the trimmer having a surface engaging the said other end of the blank to smooth it and a part shiftable into engagement with the blank to establish an indentation therein whereby the trimmer is operated, then the mold is closed and then said elements are operated.

11. A machine for shaping a tubular blank of malleable material including, a sectional mold around one end portion of the blank, a trimmer engageable with the other end of the blank shifting the blank axially into a predetermined position relative to the mold when the mold is open, elements cooperating with the mold to press the first mentioned end of the positioned blank into a predetermined shape, the trimmer having an annular series of parts shiftable radially into engagement with the blank to establish indentations therein, means operatively engaged with said parts to simultaneously operate them following positioning of the blank whereby the trimmer is operated, then the mold is closed and then said elements are operated.

12. A machine for shaping a tubular blank including, a plate shiftable into pressure engagement with one end of the blank, a shell engaged around the end portion of the blank adjacent said end of the blank while the plate engages the blank, a plug shaped to enter into said end portion of the blank and support it while the plate engages the blank, and a scoring member shiftable into pressure engagement with the exterior of said end portion of the blank while the blank is engaged by the shell and core.

13. A machine for shaping a tubular blank of malleable material including, a sectional mold engaged around one end of the blank and shaped to grip the exterior of the blank when closed, a trimmer engageable with the other end of the blank and shiftably carried to move relative thereto to act thereon and shiftable longitudinally of the blank toward the mold to shift the blank axially into a predetermined position in the mold, means operating the trimmer and mold in timed relation to first move the trimmer toward the mold and then close the mold, and elements adapted to cooperate with the mold when closed to press the first mentioned end of the positioned blank into a predetermined shape.

14. A machine for shaping a tubular blank of malleable material including, a sectional mold engageable around one end of the blank and shaped to grip the exterior of the blank when closed, a trimmer engageable with the other end of the blank and shiftably carried to move relative thereto to act thereon and shiftable longitudinally of the blank toward the mold to shift the blank axially into a predetermined position in the mold, means operating the trimmer and mold in the timed relation to first move the trimmer toward the mold and then close the mold, and elements cooperating with the mold when closed to press the first mentioned end of the positioned blank into a predetermined shape, the trimmer having a surface engaging the said other end of the blank and movable relative thereto to smooth it.

15. A machine adapted to act on a tubular blank of malleable material including, an elongate support adapted to engage the exterior of the blank intermediate the ends of the blank for longitudinal movement of the blank lengthwise of the support, a sectional mold adjacent one end of the support and engageable around one end of the blank and adapted to grip the exterior of the blank when closed, a trimmer adjacent the other end of the support and engageable with the other end of the blank and having a shell engageable over said other end of the blank and a plug engageable in said other end of the blank, elements cooperating with the mold when closed to press the first mentioned end of the blank into a predetermined shape, and operating means actuating the trimmer, then closing the mold and then actuating said elements.

16. A machine adapted to act on a tubular blank of malleable material including, an elongate support engageable with the blank intermediate the ends thereof and adapted to extend lengthwise thereof, a sectional mold adjacent one end of the support and engageable around one end of the blank, a trimmer adjacent the other end of the support and engageable with the other end of the blank and having a shell engageable over said other end of the blank, a plug engageable in said other end of the blank, and means slidably coupling the shell and plug for limited relative movement longitudinally of the shell, and elements cooperating with the mold when closed to press the first mentioned end of the blank into a predetermined shape, and operating means adapted to actuate the trimmer, then the mold and then said elements.

17. A machine adapted to act on a tubular blank including, means engageable with the exterior of the blank intermediate the ends of the blank to support the blank in a predetermined position, a plate located beyond one end of the blank and shiftable axially relative to the support and blank, a shell carried by the plate engageable over the blank at said end thereof, a guide projecting from the plate and adapted to extend into said end portion of the blank with clearance when the shell is over the blank, and a plug slidable on the guide and adapted to engage the interior of said end portion of the blank when the guide is in the blank.

References Cited in the file of this patent

UNITED STATES PATENTS

| | | |
|---|---|---|
| 406,707 | Damm | July 9, 1889 |
| 759,402 | Stanley | May 10, 1904 |
| 811,297 | Kielberg | Jan. 30, 1906 |
| 817,209 | Williams | Apr. 10, 1906 |
| 1,001,528 | Johnson | Aug. 22, 1911 |
| 1,006,574 | Lorenz | Oct. 24, 1911 |
| 1,013,954 | Rickman | Jan. 9, 1912 |
| 1,122,393 | House | Dec. 29, 1914 |
| 1,925,050 | Jagdmann et al. | Aug. 29, 1933 |
| 2,291,899 | Jones | Aug. 4, 1942 |
| 2,361,933 | Ferla | Nov. 7, 1944 |